(12) United States Patent
Kishikawa et al.

(10) Patent No.: US 12,192,301 B2
(45) Date of Patent: Jan. 7, 2025

(54) SERVICE BROKER, SERVICE BROKERING METHOD, AND RECORDING MEDIUM

(71) Applicant: Panasonic Intellectual Property Corporation of America, Torrance, CA (US)

(72) Inventors: Takeshi Kishikawa, Osaka (JP); Yoshihiro Ujiie, Tokyo (JP); Ryo Hirano, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/220,072

(22) Filed: Jul. 10, 2023

(65) Prior Publication Data
US 2023/0353656 A1 Nov. 2, 2023

Related U.S. Application Data

(63) Continuation of application No. PCT/JP2021/044367, filed on Dec. 2, 2021.

(30) Foreign Application Priority Data

Jan. 14, 2021 (WO) .................. PCT/JP2021/001066

(51) Int. Cl.
*H04L 67/562* (2022.01)
*H04L 67/12* (2022.01)
*H04L 67/51* (2022.01)

(52) U.S. Cl.
CPC ............ *H04L 67/562* (2022.05); *H04L 67/12* (2013.01); *H04L 67/51* (2022.05)

(58) Field of Classification Search
CPC ........ H04L 67/12; H04L 67/51; H04L 67/562
(Continued)

(56) References Cited

U.S. PATENT DOCUMENTS

2016/0323386 A1* 11/2016 Wideman ................ H04L 67/12
2018/0152315 A1* 5/2018 Kurauchi ................ H04L 12/40
(Continued)

FOREIGN PATENT DOCUMENTS

| JP | 2019-009559 | 1/2019 |
| WO | 2021/002013 | 1/2021 |

OTHER PUBLICATIONS

International Search Report (ISR) from International Searching Authority (Japan Patent Office) in International Pat. Appl. No. PCT/JP2021/001066, dated Apr. 6, 2021, together with an English language translation.

(Continued)

*Primary Examiner* — Wing F Chan
*Assistant Examiner* — Leon Y Tseng
(74) *Attorney, Agent, or Firm* — Greenblum & Bernstein, P.L.C.

(57) ABSTRACT

A service broker that is connected to each of a server unit and a client unit in a service offer system for offering a service from the server unit to the client unit by way of a service oriented communication includes: a communication controller that receives a frame for use in offer of the service, from the server unit or the client unit; and a service manager that determines whether a combination of a service identifier included in the frame received by the communication controller, an identifier indicating one of a transmission source and a destination of the frame, and a type of the frame is appropriate, and provides output of a result of the determination.

16 Claims, 21 Drawing Sheets

(58) Field of Classification Search
USPC .......................................................... 709/203
See application file for complete search history.

(56) References Cited

U.S. PATENT DOCUMENTS

| | | | |
|---|---|---|---|
| 2018/0351915 A1* | 12/2018 | Nakano | ............... H04L 63/0227 |
| 2019/0268420 A1 | 8/2019 | Acharya et al. | |
| 2021/0281595 A1 | 9/2021 | Hirano et al. | |
| 2021/0398364 A1* | 12/2021 | Tschache | .................. G06F 8/71 |

OTHER PUBLICATIONS

International Search Report (ISR) from International Searching Authority (Japan Patent Office) in International Pat. Appl. No. PCT/JP2021/044367, dated Feb. 22, 2022, together with an English language translation.

"IEEE Standard for Local and metropolitan area networks—Media Access Control (MAC) Security," IEEE Computer Society, IEEE Std 802.1AE™—2018, Sep. 2018.

S. Bellovin, "Guidelines for Specifying the Use of IPsec Version 2," Network Working Group, RFC 5406, BCP 146, Best Current Practice, Feb. 2009.

New Extended European Search Report (EESR) from European Patent Office (EPO) in European Patent Appl. No. 21919597.1, dated Jul. 18, 2024.

* cited by examiner

FIG. 3

| Flags (= 0x80) | Reserved (= 0) | | |
|---|---|---|---|
| \multicolumn{4}{|c|}{Length of Entries Array in Bytes (= 16)} | | | |
| Type (= 0x01) | Index 1st options (= 0) | Index 2nd options (= 0) | # of opt1 (= 1) | # of opt2 (= 0) |
| Service ID (= 0x1000) | | Instacne ID (= 0x0001) | |
| Major Version (= 0x01) | TTL (= 0xFFFF) | | |
| Minor Version (= 0x00000002) | | | |
| Length of Options Array in Bytes (= 12) | | | |
| Length (= 9) | Type (= 0x04) | Reserved (= 0) | |
| IPv4 address (= 192.168. 0.1) | | | |
| Reserved (= 0) | L4-Proto (= 0x11) | Port number (= 35000) | |

Entry / Option

FIG. 6A

| Item | Value |
|---|---|
| Public key of main server | 0x123456789... |
| Private key of main server | 0xabcdefabcdef... |
| Session key | 0xa787c89de989... |
| Public key of sub server | 0x1a2b3c4d5e6f... |
| Private key of sub server | 0xfedcba... |
| Service authority certification | Service ID: 10 (server authority) |

FIG. 6B

| Item | Value |
|---|---|
| Session key | 0xa787c89de989... |
| Public key of sub server | 0x1a2b3c4d5e6f... |
| Private key of sub server | 0xfedcba... |
| Service authority certification | Service ID: 10 (server authority) |

FIG. 6C

| Item | Value |
|---|---|
| Session key | 0xa787c89de989... |
| Public key of client | 0xf6e5d4c3b2a1... |
| Private key of client | 0xabcdef... |
| Service authority certification | Service ID: 10 (client authority) |

FIG. 7

| Service ID | Sub server candidate Present/absent | Proxy transmission Present/absent | Switching method | Switching policy | Security policy |
|---|---|---|---|---|---|
| 0x10 | Present (192.168.1.XX) | Present | Hot standby | Anytime OK | SD brokering, monitoring |
| 0x20 | Present (192.168.1.20) | Absent | any | Only hot standby during driving | SD brokering |
| 0x30 | Present (192.168.1.XX) | Absent | Cold standby | Only during parking | SD brokering only for first registration |

FIG. 8A

| Service ID | State of main server | State of sub server | Anomaly occurred | Client | Service policy (proxy transmission, switching policy, security) |
|---|---|---|---|---|---|
| 0x10 | 192.168.1.10 (Active) | 192.168.1.20 (Active) | Absent | 192.168.1.30 | ... |
| 0x20 | 192.168.1.10 (Active) | 192.168.1.20 (Stopped) | Absent | 192.168.1.31 | ... |
| 0x30 | 192.168.1.10 (Active) | 192.168.1.20 (Stopped) | Absent | - | ... |

| Service ID | Transmission source | Destination | Frame type |
|---|---|---|---|
| 0x10 | 192.168.1.10 | any | Offer |
| 0x10 | 192.168.1.20 | any | Offer |
| 0x10 | any | 192.168.1.30 | Offer |
| 0x10 | 192.168.1.30 | any | Find |
| 0x10 | any | 192.168.1.10 | Find |
| 0x10 | any | 192.168.1.20 | Find |
| ... | ... | ... | ... |

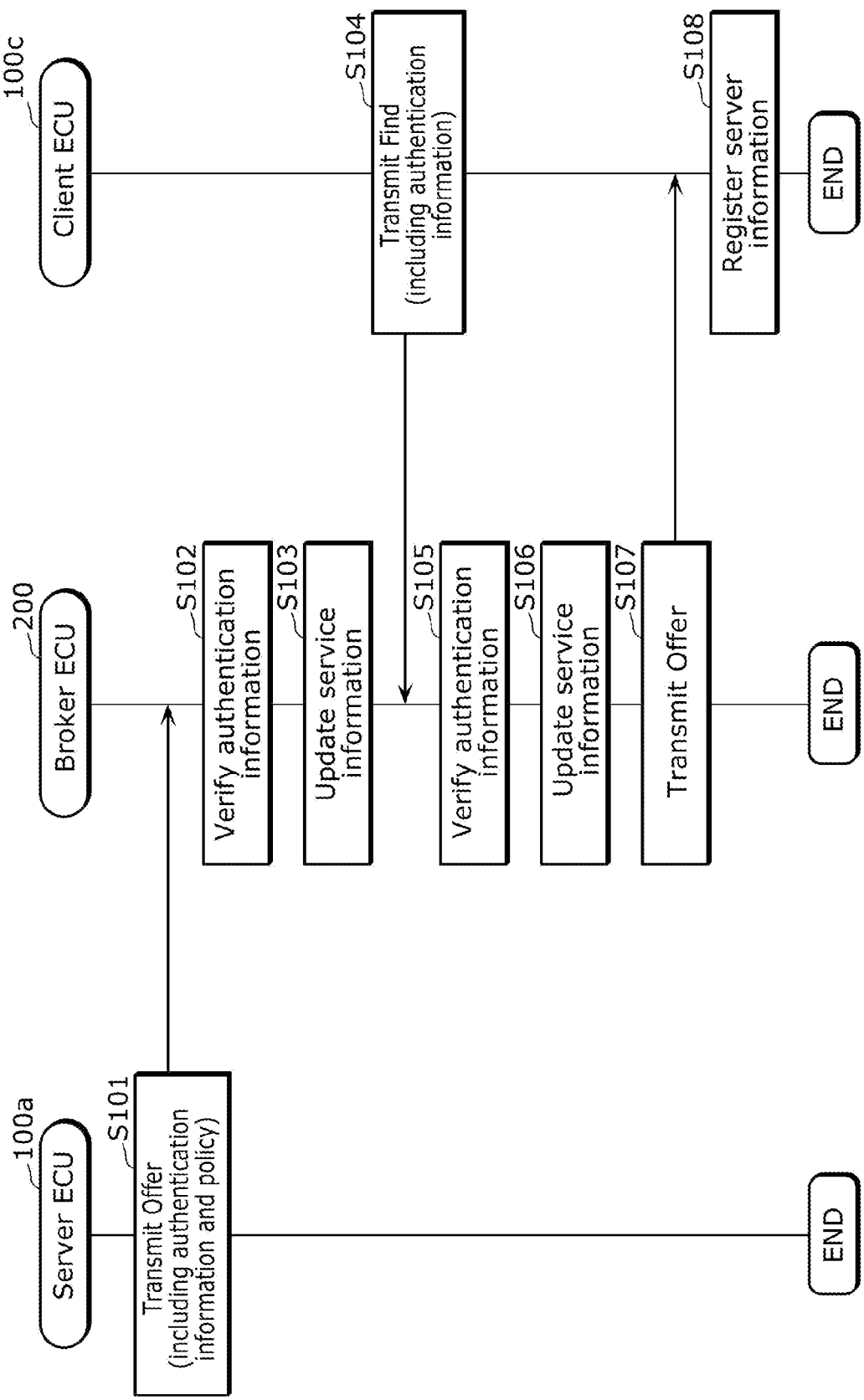

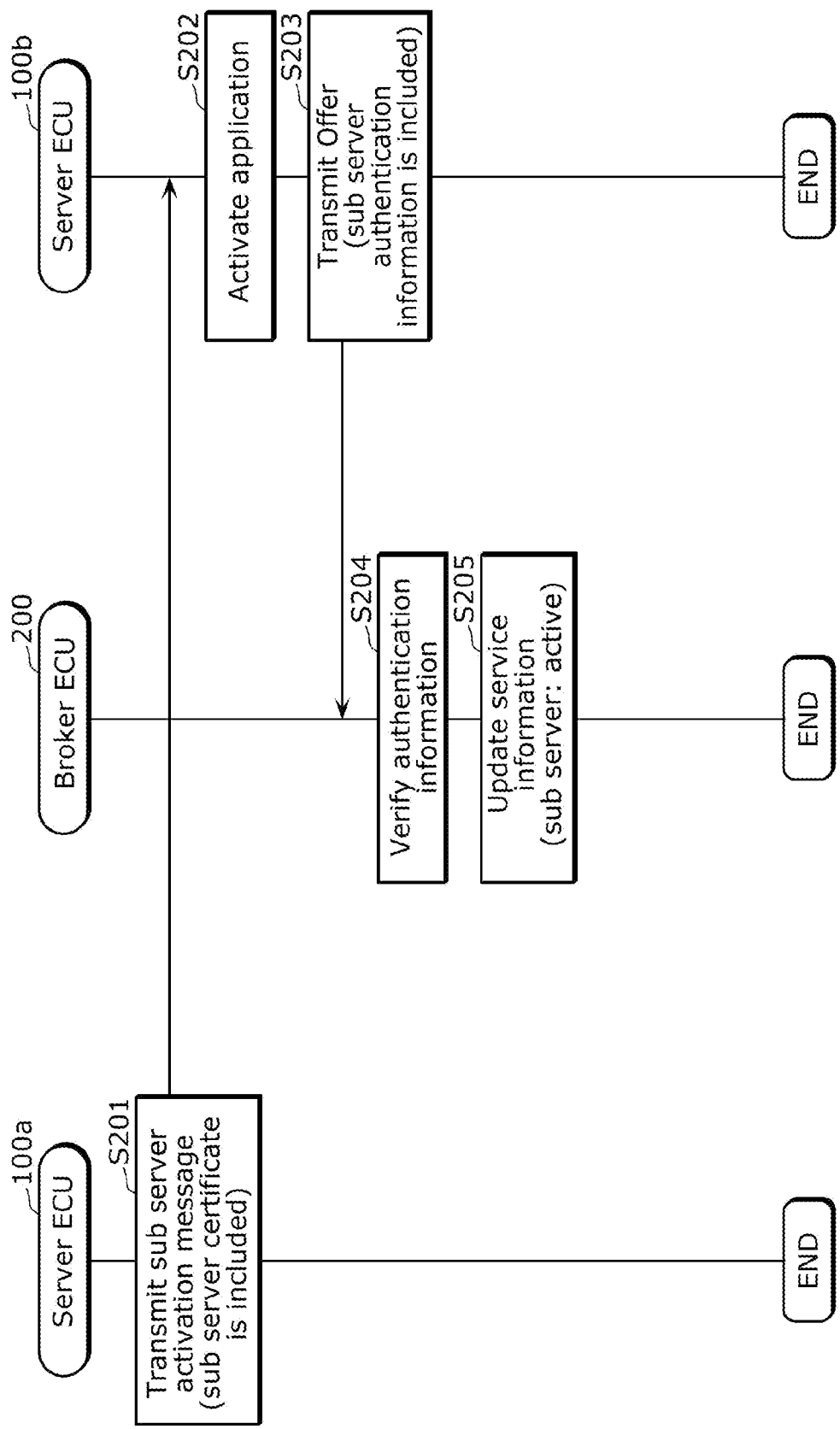

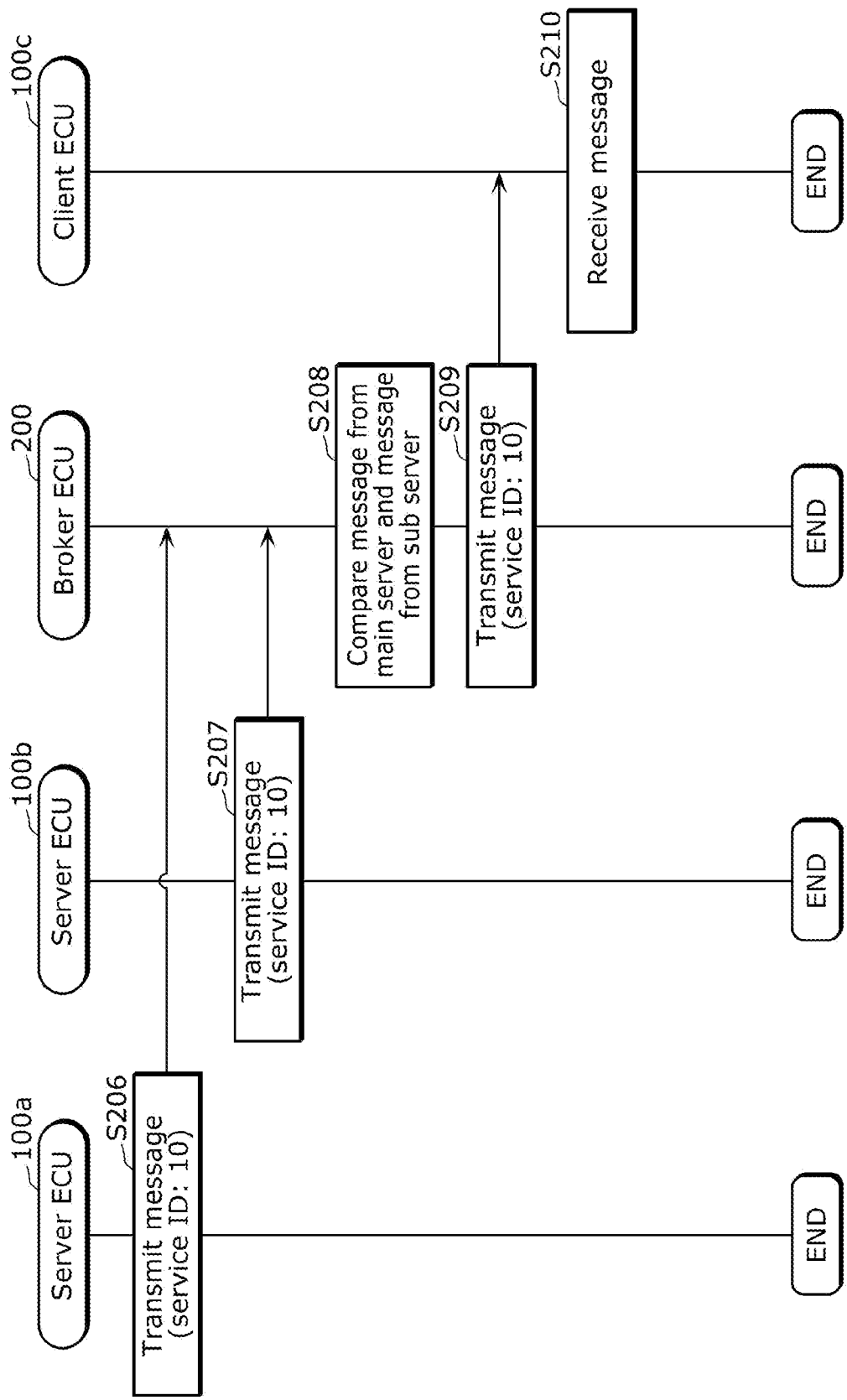

FIG. 20

Anomaly detection log ID: 100200
Anomaly code: 0x10 (service policy violation)
Detection details: anomaly in access source information has been detected in service having service ID of 0x10
Original packet: XXXXXXXXXXXXXXXXXXXXXXXXXXXX
Action: original packet has been discarded, but no switching to sub server has been made because of mismatch of vehicle information

SERVICE BROKER, SERVICE BROKERING METHOD, AND RECORDING MEDIUM

CROSS REFERENCE TO RELATED APPLICATIONS

This is a continuation application of PCT International Application No. PCT/JP2021/044367 filed on Dec. 2, 2021, designating the United States of America, which is based on and claims priority of PCT International Application No. PCT/JP2021/001066 filed on Jan. 14, 2021, designating the United States of America. The entire disclosures of the above-identified applications, including the specifications, drawings and claims are incorporated herein by reference in their entirety.

FIELD

The present disclosure relates to a service broker, a service brokering method, and a recording medium.

BACKGROUND

In recent years, many devices called electronic control units (ECUs) have been disposed in vehicles. There are methods for preventing communication by unauthorized nodes utilizing cryptographic communication against spoofing threat in communication between ECUs.

CITATION LIST

Non Patent Literature

NPL 1: RFC5406: Guidelines for Specifying the Use of IPsec Version 2
NPL 2: IEEE 802.1AE: MAC Security

SUMMARY

Technical Problem

However, the use of cryptographic communication requires encryption or decryption processing by transmission and reception nodes, which causes a problem that overhead inevitably occurs.

In view of this, the present disclosure provides a service brokering method which appropriately performs access control for communication relating to service offer.

Solution to Problem

A service broker according to an aspect of the present disclosure is a service broker that is connected to each of a server unit and a client unit in a service offer system for offering a service from the server unit to the client unit by way of a service oriented communication, and includes: a communication controller that receives a frame for use in offer of the service, from the server unit or the client unit; and a service manager that determines whether a combination of a service identifier included in the frame received by the communication controller, an identifier indicating one of a transmission source and a destination of the frame, and a type of the frame is appropriate, and provides output of a result of the determination.

It is to be noted that, these general and specific aspects may be implemented using, a system, a method, an integrated circuit, a computer program, or a computer readable medium such as a CD-ROM, or any combination of, systems, methods, integrated circuits, computer programs, or computer readable media.

Advantageous Effects

According to the present disclosure, it is possible to appropriately perform communication access control relating to service offer.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a diagram indicating one example of a SOME/IP SD message according to the embodiment.

FIG. 6A is a diagram indicating a first example of application authentication information according to the embodiment.

FIG. 6B is a diagram indicating a second example of application authentication information according to the embodiment.

FIG. 6C is a diagram indicating a third example of application authentication information according to the embodiment.

FIG. 7 is a diagram indicating one example of a service policy according to the embodiment.

FIG. 8A is a diagram indicating one example of service information according to the embodiment.

FIG. 10 is a diagram indicating a sequence of service information registration that is performed by the broker ECU according to the embodiment.

FIG. 12 is a diagram indicating a sub sever registration sequence that is performed by the broker ECU according to the embodiment.

FIG. 13 is a diagram indicating a communication sequence for proxy transmission that is performed by the broker ECU according to the embodiment.

FIG. 20 is a diagram indicating one example of a log that is notified in the case where a communication anomaly has been detected in the other variation.

Figure 1:
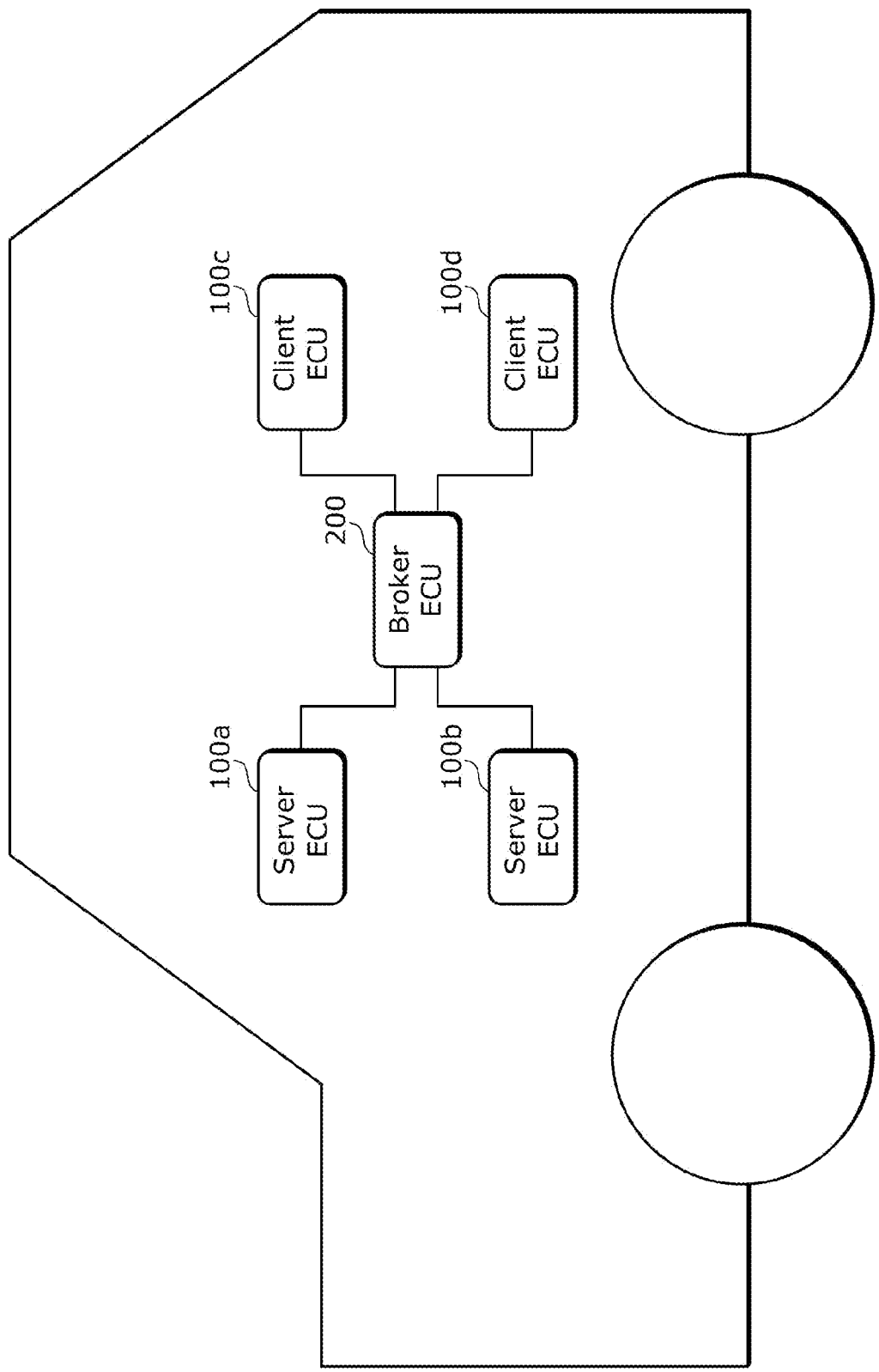
FIG. 1 is a diagram illustrating an overall configuration of an on-vehicle network system according to an embodiment.

DESCRIPTION OF EMBODIMENT (Underlying Knowledge Forming Basis of the Present Disclosure)

The Inventors have found that the following problem occurs in relation to the service brokers, etc., disclosed in the "Background" section.

There are many communication protocol standards for on-vehicle networks which connect ECUs in vehicles. One of the mainstream standards among these is a controller area network (hereinafter referred to as CAN (registered trademark)).

In CAN, an ECU broadcasts information about a sensor value, etc., and an ECU which desires to obtain the information about the sensor value, etc., receives the information about the sensor value, etc., which has been broadcast.

Furthermore, with spread of automatic driving or connected cars, increase in on-vehicle network traffic is expected, and spread of on-vehicle Ethernet (registered trademark) as a communication protocol is increasingly used.

On-vehicle Ethernet (registered trademark) introduces service oriented communication together instead of signal oriented communication such as CAN or together with signal oriented communication. Thus, it is possible to achieve effective developing processes.

As a method for implementing service oriented communication, Service Oriented Middle WarE Over IP (hereinafter, SOME/IP) has been defined by AUTomotive Open System ARchitecture (AUTOSAR).

Threat of spoofing attacks by unauthorized nodes in the CAN is also threat in SOME/IP communication. Known methods against such threat include methods for preventing communication by unauthorized nodes by utilizing cryptographic communication which have been used in internet protocol (IP) communication (see Non Patent Literature 1 or Non Patent Literature 2).

Furthermore, in a control network which includes not only an on-vehicle network but also a sensor and an actuator and controls a system, not only achievement of security but also achievement of realtimeliness and reliability is also important. Since important elements are different depending on service characteristics, it is desirable that quality of services (QoS) such as a security policy and realtimeliness appropriate for a desired service can be set according to the service.

Since a vehicle has a network and complex ECUs are used as described above, an attacker may perform a spoofing attack by exploiting the vulnerability of the ECUs for attacking the ECUs.

However, each of Non Patent Literature 1 and Non Patent Literature 2 uses cryptographic communication which requires encryption or decryption processing by transmission and reception nodes, and thus entails the problem that overhead inevitably occurs.

In view of this, the present disclosure provides a service brokering method which appropriately performs access control for communication relating to service offer.

More specifically, the present disclosure provides a flexible brokering method that is performed by a broker ECU which brokers communication between ECUs that perform service oriented communication in an on-vehicle network, by performing access control for a service or switching service offer destinations in the case where an error has occurred, based on a service polity.

A service broker according to an aspect of the present disclosure is a service broker that is connected to each of a server unit and a client unit in a service offer system for offering a service from the server unit to the client unit by way of a service oriented communication, and includes: a communication controller that receives a frame for use in offer of the service, from the server unit or the client unit; and a service manager that determines whether a combination of a service identifier included in the frame received by the communication controller, an identifier indicating one of a transmission source and a destination of the frame, and a type of the frame is appropriate, and provides output of a result of the determination.

In this way, in the service oriented communication, the service broker is capable of detecting unauthorized communication by spoofing in the server unit or the client unit, and thus is capable of preventing inappropriate access to the server unit or the client unit. In this way, the service broker is capable of appropriately performing access control for communication relating to the offer of the service.

For example, the communication controller may further: receive a service offer frame from the server unit before the offer of the service, the service offer frame including first service information indicating the service to be offered; and receive a service find frame from the client unit before the offer of the service, the service find frame including second service information indicating a service find target, and the service manager may further cause the communication controller to transmit the service offer frame to the client unit, the service offer frame including the first service information identical to the second service information included in the service find frame received by the communication controller, the client unit being a transmission source of the service find frame received.

According to the above-described aspect, the service broker appropriately brokers the service offer frame and the service find frame between the server unit and the client unit. In this way, it is possible to prevent the service offer frame and the service find frame from being received by a device that is irrelevant to offer or enjoyment of the service, and to appropriately prevent spoofing onto the server unit or the client unit. In this way, the service broker is capable of appropriately performing access control for communication relating to the offer of the service.

For example, the service offer frame may include first authentication information indicating that the server unit has authority as a server that offers the service indicated by the first service information included in the service offer frame, the service find frame may include second authentication information indicating that the client unit has authority as a client that is offered with the service indicated by the second service information included in the service find frame, and the service manager may further: determine that the service offer frame is valid, when the first authentication information included in the service offer frame has been successfully verified; determine that the service find frame is valid, when the second authentication information included in the service find frame has been successfully verified; and cause the communication controller to transmit the service offer frame to the client unit, when the service manager has determined that the service offer frame and the service find frame are valid.

According to the above-described aspect, the service broker determines, using the authentication information, that the server unit surely has the authority as the server that offers the service, and that the client unit surely has the authority as the client that is offered with the service, and then performs control so that the server unit offers the service to the client unit. In this way, it is possible to prevent a device that does not have the authority as the server from offering the service, and prevent a device that does not have the authority as the client from being offered with the service. In this way, the service broker is capable of appropriately performing access control for communication relating to the offer of the service.

For example, when the communication controller has received a first frame for use in the offer of the service from the server unit that offers the service, the communication controller may transmit the first frame to the client unit that is offered with the service, and when the communication controller has received a second frame for use in the offer of the service from the client unit that is offered with the service, the communication controller may transmit the second frame to the server unit that offers the service.

According to the above-described aspect, the service broker appropriately brokers the frame used for the offer of the service between the server unit and the client unit. In this way, it is possible to prevent the frame used for the offer of the service from being received by a device that is irrelevant to offer or enjoyment of the service, and to appropriately prevent spoofing onto the server unit or the client unit. In this way, the service broker is capable of appropriately performing access control for communication relating to the offer of the service.

For example, the service broker may include a proxy transmitter that executes proxy transmission processing, and the proxy transmission processing may include: modifying information indicating a transmission source included in the first frame into an identifier of the service broker, and transmitting the first frame to the client unit, when the communication controller has received the first frame; and modifying information indicating a transmission source included in the second frame into an identifier of the service broker, and transmitting the second frame to the server unit, when the communication controller has received the second frame.

According to the above-described aspect, the service broker changes the transmission source of the frame to the identifier of the own device when brokering the frame used for the offer of the service. This allows the server unit to offer the service without obtaining the identifier of the client unit, and allows the client unit to be offered with the service without obtaining the identifier of the server unit. In this way, by further reducing the chances that the identifiers of the server unit and the client unit are obtained by another device, it is possible to appropriately prevent spoofing onto the server unit or the client unit. In this way, the service broker is capable of appropriately performing access control for communication relating to the offer of the service.

For example, the server unit, the client unit, and the service broker may be provided in a vehicle, the service broker may further include a vehicle state holder that holds state information indicating a state of the vehicle, and the proxy transmitter may control whether to execute the proxy transmission processing according to the state information held by the vehicle state holder.

According to the above-described aspect, the service broker controls whether to execute proxy transmission according to the state of the vehicle. The requirements for reliability and realtimeliness desired for offer of a service vary depending on the service. For this reason, by means of the service broker controlling whether to execute proxy transmission according to the state of the vehicle, whether to execute proxy transmission according to the reliability and realtimeliness desired for the offer of a service is controlled. Thus, the service broker is capable of appropriately performing access control for communication relating to the offer of the service, through control of proxy transmission according to the reliability and realtimeliness desired for the offer of the service.

For example, the server unit may include a first server unit and a second server unit, and when the communication controller has received the service offer frame from the first server unit, the communication controller may be in a standby state for a predetermined period; and when the communication controller has received the service offer frame from the second server unit in the standby state, the communication controller may transmit, to the client unit, one of the service offer frame received from the first server unit and the service offer frame received from the second server unit.

According to the above-described aspect, the service broker includes a redundant server unit in the service offer system. In this way, the service broker contributes achievement of a more robust system configuration while maintaining communication that is compatible with the case where a service offer system includes a single server unit. In this way, the service broker is capable of appropriately performing access control for communication relating to the offer of the service while increasing the robustness of the system.

For example, when the communication controller does not receive the service offer frame from the second server unit in the standby state, the communication controller may transmit the service offer frame received from the first server unit to the client unit, and execute predetermined processing that is performed when an anomaly has occurred in the second server unit.

According to the above-described aspect, in the case where an anomaly has occurred in the one of the server units in a redundant configuration, the service broker maintains the redundant configuration of the server unit by contributing to the offer of the service by the other server unit. In this way, the service broker is capable of appropriately performing access control for communication relating to the offer of the service while increasing the robustness of the system.

For example, when the communication controller does not receive the service offer frame from the second server unit in the standby state, the communication controller may control whether to transmit the service offer frame received from the first server unit to the client unit according to a type of the service.

According to the above-described aspect, the service broker controls, according to the type of the service, the offer of the service by the other server unit in the case where an anomaly has occurred in the one of the server units in a redundant configuration. Since the requirements for reliability and realtimeliness desired for the offer of a service vary depending on the service, performing the control by the service broker contributes to controlling the service that is offered by the other server unit according to the reliability and realtimeliness desired for the offer of the service. Thus, the service broker is capable of appropriately performing access control for communication relating to the offer of the service, through control of the offer of the service in the redundant configuration according to the reliability and realtimeliness desired for the offer of the service.

For example, the server unit, the client unit, and the service broker may be provided in a vehicle, the service broker may further include a vehicle state holder that holds state information indicating a state of the vehicle, and when the communication controller does not receive the service offer frame from the second server unit in the standby state, the communication controller may control whether to transmit the service offer frame received from the first server unit to the client unit according to the state information held by the vehicle state holder.

According to the above-described aspect, the service broker controls, according to the state of the vehicle, the offer of the service by the other server unit in the case where an anomaly has occurred in the one of the server units in a redundant configuration. Since the requirements for reliability and realtimeliness desired for the offer of a service vary depending on the state of the vehicle, performing the control by the service broker contributes to controlling the service that is offered by the other server unit according to the reliability and realtimeliness desired for the offer of the service. Thus, the service broker is capable of appropriately performing access control for communication relating to the offer of the service, through control of the offer of the service in the redundant configuration according to the reliability and realtimeliness desired for the offer of the service.

For example, the server unit may include a first server unit and a second server unit, and when the communication controller has received the service find frame from the client unit, the communication controller may transmit the service find frame received, to both the first server unit and the second server unit.

According to the above-described aspect, the service broker appropriately brokers the service find frame when the server unit has the redundant configuration. In this way, the service broker is capable of appropriately performing access control for communication relating to the offer of the service while increasing the robustness of the system.

For example, the server unit may comprise a plurality of server units, and the service manager may: hold communication state information indicating whether the plurality of server units are in a communication possible state; and transmit the communication state information held to the client unit.

According to the above-described aspect, the service broker causes the client unit to appropriately recognize the information indicating the server unit that is capable of offering the service. In this way, the service broker is capable of appropriately performing access control for communication relating to the offer of the service while increasing the security and robustness of the on-vehicle network system.

For example, the service manager has detected that one of the plurality of server units is in a communication impossible state, the service manager may transmit, to the client unit, the service offer frame received from the server unit that is in a communication possible state among the plurality of server units, with reference to the communication state information.

According to the above-described aspect, the service broker is capable of causing the client unit to recognize the information about the substitute server unit when it is difficult to continue the offer of the service by the one of the serve units. In this way, the service broker is capable of appropriately performing access control for communication relating to the offer of the service while further increasing the security and robustness of the on-vehicle network system.

For example, the output of the result of the determination may include one of: displaying information indicating the result of the determination onto a display screen; and transmitting the information indicating the result of the determination to an external device via a network.

According to the above-described aspect, the service broker is capable of more easily outputting the information indicating the result of the determination by displaying the information indicating the result of the determination onto the display screen or transmitting the information to the external device. In this way, the service broker is capable of appropriately performing access control for communication relating to the offer of the service.

It is to be noted that, these general and specific aspects may be implemented using, a system, a method, an integrated circuit, a computer program, or a computer readable medium such as a CD-ROM, or any combination of, systems, methods, integrated circuits, computer programs, or computer readable media.

Hereinafter, embodiments are specifically described with reference to the drawings.

It is to be noted that each of the embodiments described below indicates a general or specific example. The numerical values, shapes, materials, constituent elements, the arrangement and connection of the constituent elements, etc., indicated in the following embodiments are mere examples, and do not limit the scope of the present disclosure. Among the constituent elements in the following embodiments, constituent elements that are not recited in any of the independent claims which define the most generic concept of the present disclosure are described as optional constituent elements.

EMBODIMENT

In an embodiment, a description is given of a service broker which appropriately performs access control for communication relating to offer of a service. More specifically, a description is given of a service brokering method in an on-vehicle network system in which a plurality of electronic control units (ECUs) perform service oriented communication through Ethernet (registered trademark). The on-vehicle network system is one example of a service offer system. It is to be noted that, other examples of service offer systems include a control network system that is for example a robot control network system or a mobility control network system.

[1.1 Overall Configuration of On-Vehicle Network System]

FIG. 1 is a diagram illustrating an overall configuration of an on-vehicle network system according to the embodiment. The on-vehicle network system is configured to include server ECUs 100a and 100b, client ECUs 100c and 100d, and broker ECU 200.

Server ECU 100a is a device which offers client ECU 100c or 100d with a service. Server ECU 100b is a device which offers a service likewise server ECU 100a. Server ECUs 100a and 100b are also referred to as a server unit.

Client ECU 100c is a device which is offered with a service that is offered by server ECU 100a or 100b. Client ECU 100d is a device which is offered with a service likewise client ECU 100c. Client ECUs 100c and 100d are also referred to as a client unit.

Examples of services include offering information such as a sensor value, or the like, or performing predetermined arithmetic processing according to a request and outputting the result of the arithmetic processing.

Broker ECU 200 is a device which brokers offer of a service from server ECU 100a or 100b to client ECU 100c or 100d. Broker ECU 200 is connected to server ECUs 100a and 100b, and client ECUs 100c and 100d in such a manner that broker ECU 200 is able to perform communication with the devices through Ethernet.

Server ECUs 100a and 100b, and client ECUs 100c and 100d contribute to achievement of functions of a vehicle by performing communication using SOME/IP.

Although the on-vehicle network system is configured to include only server ECUs 100a and 100b, client ECUs 100c and 100d, and broker ECU 200 in this embodiment in order to simplify descriptions, it is to be noted that another ECU or network may be present.

[1.2 SOME/IP Message Format]

For SOME/IP, the following four kinds of communication methods are defined: Request/Response, Fire/Forget, Events, and Get/Set/Notifier. Server ECUs 100a and 100b, and client ECUs 100c and 100d achieve service oriented communication by combining these communication methods. In SOME/IP, a method for establishing a session with a communication partner is also prepared. The method is referred to as Service Discovery (SD).

Figure 2:
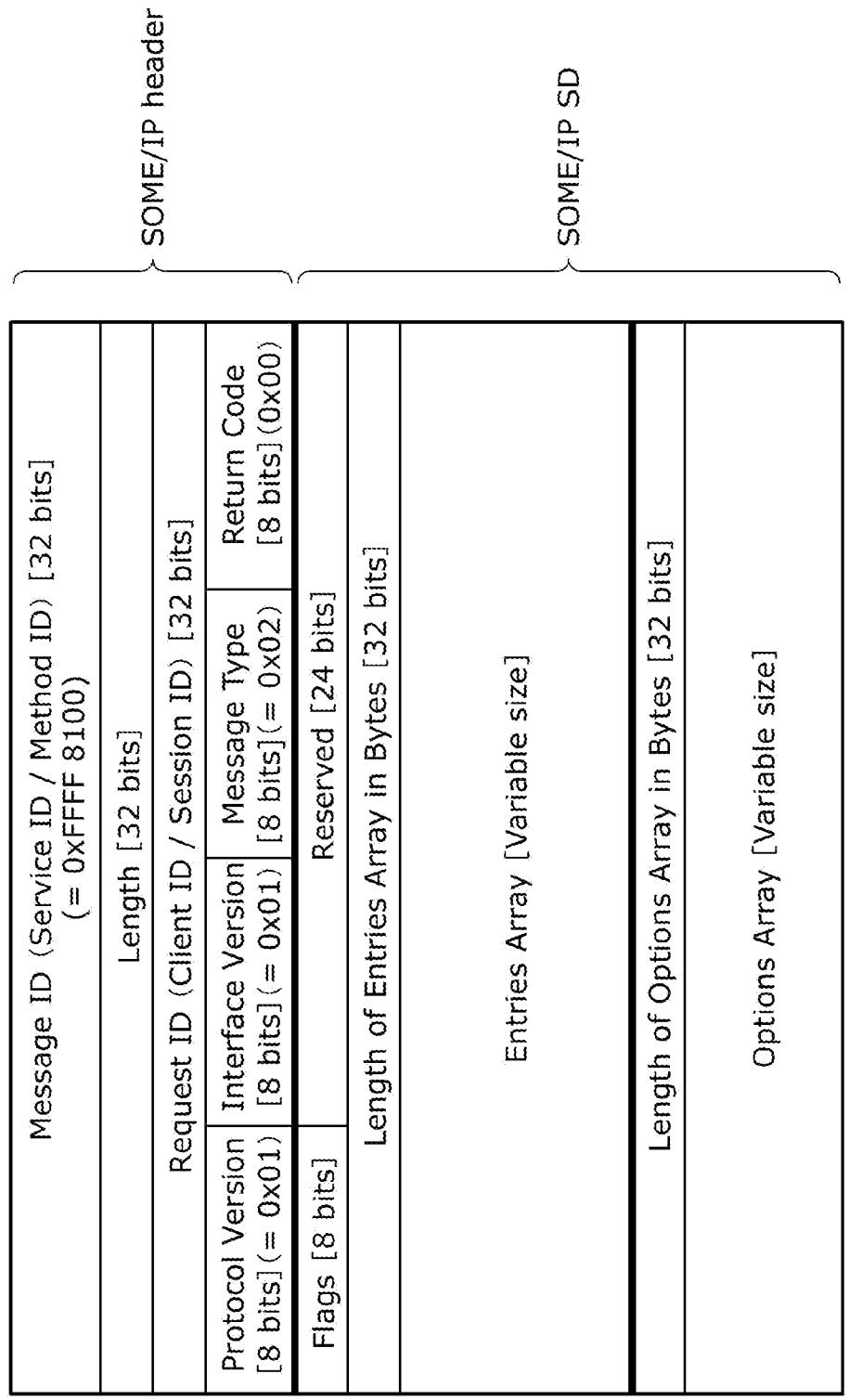
FIG. 2 is a diagram indicating the format of a SOME/IP SD message according to the embodiment.

FIG. 2 is a diagram indicating a message format that is used for the SOME/IP SD, according to the embodiment.

The message format in FIG. 2 is stored in the payload of an Ethernet frame. In FIG. 2, one row has a 32-bit length in which the first part is the SOME/IP header and the second part is the SOME/IP SD payload.

The SOME/IP header includes the following fields: Message ID, Length, Request ID, Protocol Version, Interface Version, Message Type, and Return Code.

The Message ID stores an identifier of a message. The Message ID is 0xFFFF8100 in the case of SOME/IP SD.

The Length stores the number of bytes of data located after the Length field.

The Request ID stores a number obtained by combining a Client ID and a Session ID.

In the case of Service Discovery, the Protocol Version is set to 0x01, the Interface Version is set to 0x01, the Message Type is set to 0x02, and the Return Code is set to 0x00.

The SOME/IP SD payload includes the following fields: Flags, Reserved, Length of Entries Array in Bytes, Entries Array, Length of Options Array in Bytes, and Options Array.

FIG. 3 is a diagram indicating one example of a SOME/IP SD message according to the embodiment. The SOME/IP SD message in FIG. 3 is one example of a message indicating that the service having the service ID number of 0x1000 can be offered.

The Flags has 0x80 that has been set thereto, and a Reboot Flag has been set. The region of Reserved (Reversed region) has been set to 0.

The Length of Entries Array in Bytes stores the number of bytes in Entry, and the number of bytes is set to 16 in FIG. 3.

The Type can be set to 0x00 or 0x01. Here, 0x00 means a Find, and 0x01 means an Offer. The Find is used when a client ECU which is offered with a service requests offer of a service that is necessary. The Offer is used when a server ECU which offers a service notifies a service that the server ECU itself can offer. In FIG. 3, the Type is 0x01. The message indicated in FIG. 3 is a message that notifies information relating to the service that the server ECU itself can offer.

The Index 1st options indicates the position of the first option. In FIG. 3, 0 is set to the Index 1st options. In other words, the first option is disposed firstly in the option region.

The Index 2nd options indicates the position of the second option. In FIG. 3, 0 is set to the Index 2nd options. It is to be noted that, as described later, options 2 are not used for the message indicated in FIG. 3, the value that is set to Index 2nd options is not used.

Here, # of opt1 indicates the number of options 1. In FIG. 3, 1 is set to the # of opt1.

Here, # of opt2 indicates the number of options 2. In FIG. 3, 0 is set to the # of opt2, which indicates that options 2 are not used.

Service ID indicates the ID indicating the type of a service. In FIG. 3, 0x1000 is stored in the Service ID.

Instance ID is an ID indicating an instance of a service, and in FIG. 3, indicates the instance of 0x0001.

Major Version is information that is used for version management of a service, and is set to 0x01 in FIG. 3.

TTL is a field in which the expiration date of a service is set on a per-second basis. In FIG. 3, 0xFFFF is set as the expiration date. The fact that 0xFFFF is set to the TTL means that the service is valid until the next activation timing of the ECU.

Minor Version is information that is used for version management of a service, and is set to 0x00000002 in FIG. 3.

Next, Option region includes the following fields: Length of Options Array in Bytes, Length, Type, Reserved, IPv4 address, Reserved, L4-Proto, and Port number.

The Length of Options Array in Bytes indicates the length of the Option region. In FIG. 3, the Length of Options Array in Bytes indicates 12 bytes.

The Length indicates the number of bytes in the Option region. The value that is set to the Length is determined according to the type of the options(s).

The Type indicates the type of the Option region.

Here, 0 is stored into the Reserved region.

FIG. 3 indicates an example of communication using IPv4. The Length is set to 9, the Type is set to 0x04, and the Reserved region is set to 0x00.

An IPv4 address indicates the IP address of a server. In FIG. 3, 192.168.0.1 is set as the IPv4 address.

Here, 0 is stored into the Reserved region.

L4-Proto indicates a protocol in Layer 4 that is the transport layer. Here, 0x11 is set to the L4-Proto, and indicates that User Datagram Protocol (UDP) is used.

The port number indicates the port number of the transport layer to be used. The port number indicates the port number of 35000 in FIG. 3.

[1.3 Configuration of Server ECU 100*a*]

Figure 4:
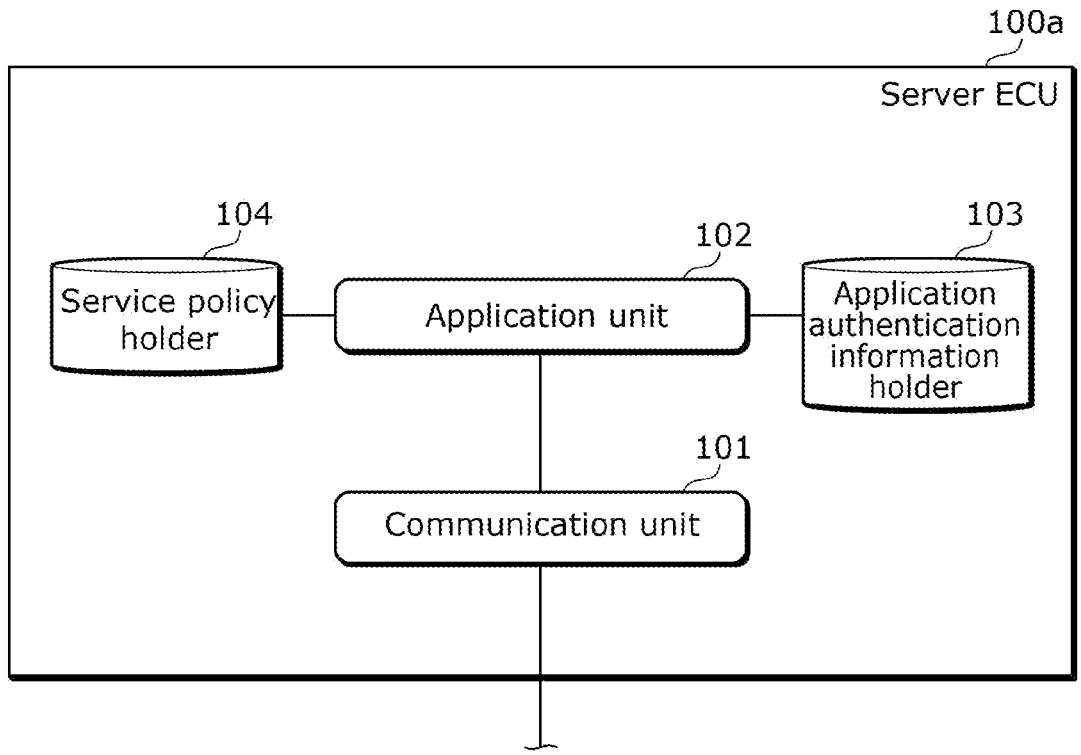
FIG. 4 is a diagram illustrating a configuration of a server ECU according to the embodiment.

FIG. 4 is a diagram illustrating a configuration of server ECU 100*a* according to the embodiment. Server ECU 100*a* is implemented by a computer that includes a processor, memory, a communication interface, etc., and is configured to include, for example, communication unit 101, application unit 102, application authentication information holder 103, and service policy holder 104.

It is to be noted that server ECU 100*b*, client ECU 100*c*, or client ECU 100*d* have a configuration similar to that of server ECU 100*a*, descriptions of these ECUs are omitted.

Communication unit 101 is a communication interface that performs communication with other ECUs. For example, communication unit 101 is an Ethernet communication interface, and in this case, is connected to broker ECU 200 via Ethernet. Communication unit 101 receives a message from Ethernet, and notifies application unit 102 of the message. Communication unit 101 also transmits a message according to a request from application unit 102 to Ethernet.

Application unit 102 executes an application that implements the main function of server ECU 100*a*. For example, in the case of server ECU 100*a* or 100*b*, application unit 102 includes an application that offers a service in service oriented communication. For example, in the case of client ECU 100*c* or 100*d*, application unit 102 includes an application that is offered with a service.

In addition, application unit 102 refers to information stored in application authentication information holder 103, and transmits, to broker ECU 200, information that authenticates access authority to the service of application unit 102 itself. Application unit 102 further notifies broker ECU 200 of a service policy by referring to service policy holder 104.

Application authentication information holder 103 holds information relating to a service authority certificate that certifies access authority to the service held by application unit 102. Details of the application authentication information are described later.

Service policy holder 104 holds information indicating a security policy for the service and a policy relating to realtimeliness or reliability. Details of the service policy are described later.

[1.4 Configuration of Broker ECU 200]

Figure 5:
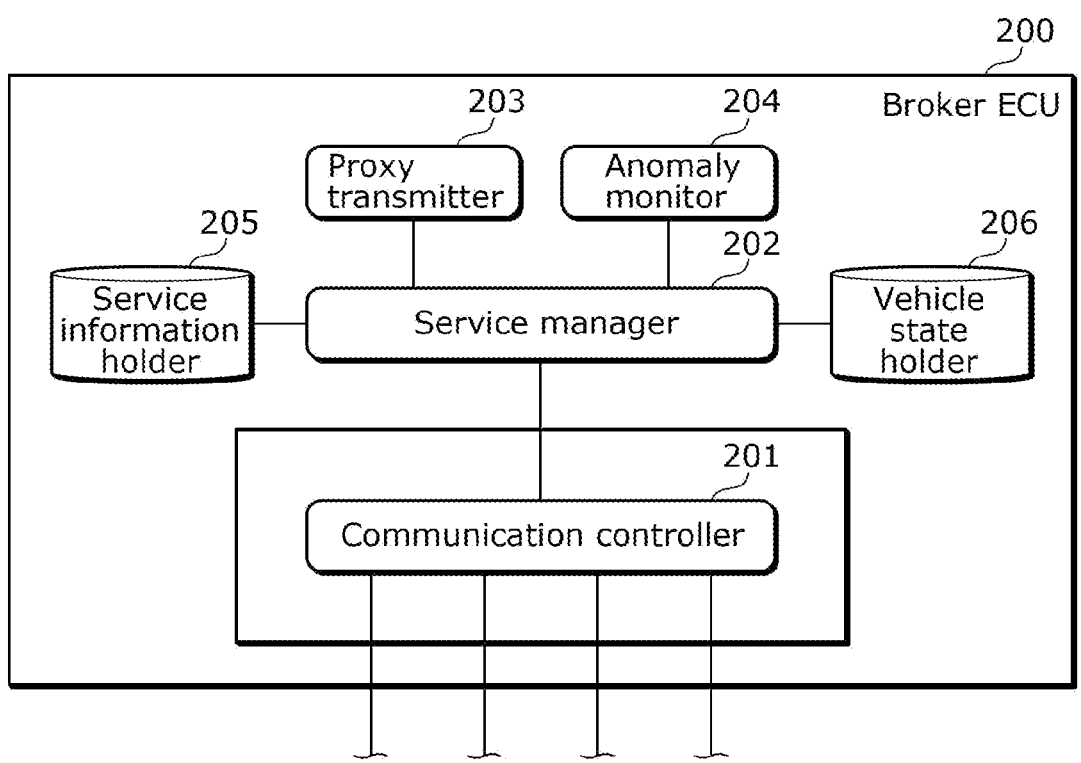
FIG. 5 is a diagram illustrating a configuration of a broker ECU according to the embodiment.

FIG. 5 is a diagram illustrating a configuration of broker ECU 200 according to the embodiment.

In FIG. 5, broker ECU 200 is configured to include communication controller 201, service manager 202, proxy transmitter 203, anomaly monitor 204, service information holder 205, and vehicle state holder 206.

Communication controller 201 is a communication interface that performs communication with other ECUs. Communication controller 201 includes, for example, four Ethernet ports. Each of the Ethernet ports is connected to server ECUs 100*a* and 100*b* and client ECUs 100*c* and 100*d* in such a manner that communication controller 201 is able to perform communication with the devices. Communication controller 201 transmits or receives Ethernet frames between server ECUs 100*a* and 100*b* and client ECUs 100*c* and 100*d*.

In addition, communication controller 201 receives a message included in a frame that flows in a network, provides a notification to service manager 202, receives a transmission request from service manager 202, and transmits the frame including the message to Ethernet. Communication controller 201 takes a role as an Ethernet switch that transfers the message to an appropriate port according to the destination included in the message received.

In the case where server ECUs 100*a* and 100*b* have a redundant configuration: when communication controller 201 has received a service offer frame from server ECU 100*a*, communication controller 201 may be in a standby state for a predetermined period: and when communication controller 201 has received a service offer frame from server ECU 100*b* in the standby state, communication controller 201 may transmit one of two of the service offer frames received to client ECU 100*c* or 100*d*.

In the case where server ECUs 100*a* and 100*b* have a redundant configuration, when communication controller 201 has received a service find frame from client ECU 100*c* or ECU 100*d*, communication controller 201 may transmit the service find frame received to both server ECUs 100*a* and 100*b*.

In the case where server ECUs 100*a* and 100*b* have a redundant configuration, it is to be noted that, for example, server ECU 100*a* corresponds to a first server unit or a main server, and server ECU 100*b* corresponds to a second server unit or a sub server.

In response to the message received in service oriented communication, service manager 202 executes brokering of the service, based on the service policy stored in service information holder 205 and the vehicle state that is stored in vehicle state holder 206. The brokering of the service means completion of the offer of the service from the server ECU to the client ECU by relaying (or transferring) the frame(s) relating to the offer of the service between the server ECU and the client ECU.

Service manager 202 determines whether the combination of the identifier of the service included in the frame received by communication controller 201, the identifier indicating the transmission source or the destination of the frame, and the type of the frame, and outputs the result of the determination. The processing relating to the brokering of the service are described in detail later.

When the service brokering method is a method in which proxy transmission is "present", service manager 202 offers proxy transmitter 203 with a message relating to the service corresponding to the proxy transmission. In response to a transmission request from proxy transmitter 203, service manager 202 requests communication controller 201 to transmit a message.

Service manager 202 further notifies anomaly monitor 204 of a message in order to monitor whether an anomaly has occurred in the communication of the service.

Service manager 202 may hold communication state information indicating whether server ECUs 100*a* and 100*b* are in a communication possible state, and transmit the communication state information held to client ECUs 100*c* and 100*d*.

At this time, when service manager 202 has detected that one of server ECUs 100*a* and 100*b* is in a communication impossible state, service manager 202 may transmit the service offer frame received from the other server ECU that is in a communication possible state to client ECUs 100*c* and 100*d* with reference to the communication state information.

In addition, outputting the result of the determination made by service manager 202 may include displaying the information indicating the result of the determination onto a display screen, or transmitting the information indicating the result of the determination to an external device through a network. The external device is a device located outside the on-vehicle network system and connected to the on-vehicle network system via a network.

Proxy transmitter 203 executes proxy transmission processing that is processing of transmitting a communication frame in replace for either server ECU 100a or server 100b or either client ECU 100c or client ECU 100d.

When the brokering method in the service policy is a method in which proxy transmission is "present", proxy transmitter 203 transmits a communication frame regarding broker ECU 200 as a subject that performs transmission and/or reception of the message in replace for server ECU 100a or 100b. Specifically, when proxy transmitter 203 has received an Offer message including offer information about a service from server ECU 100a or 100b, proxy transmitter 203 transfers the Offer message by transmitting the Offer message including the offer information about the service to client ECU 100c or 100d by causing broker ECU 200 to function as the offerer of the service in replace for server ECU 100a or 100b.

In addition, when proxy transmitter 203 has received a request message for a service from client ECU 100c or 100d, proxy transmitter 203 transfers the request message by transmitting the request message to server ECU 100a or 100b by causing broker ECU 200 to function as the receiver of the service in replace for client ECU 100c or 100d.

Furthermore, when proxy transmitter 203 has received a reply or notification message from server ECU 100a or 100b, proxy transmitter 203 transfers the reply or notification message to client ECU 100c or 100d by causing broker ECU 200 to function as the sender of the message in replace for server ECU 100a or 100b.

When the brokering method in the service policy is the method in which proxy transmission is "present" in this way, broker ECU 200 performs brokering by behaving as client ECU 100c or 100d for server ECU 100a or 100b and behaving as server ECU 100a or 100b for client ECU 100c or 100d.

When server ECUs 100a and 100b have a redundant configuration in order to increase service reliability, proxy transmitter 203 transfers a message from client ECU 100c or 100d to server ECU 100a or 100b. There is a case where proxy transmitter 203 transfers a message of the main server in the case of a message from server ECU 100a or 100b, and proxy transmitter 203 may transfer a message of a sub server. In addition, there is a case where proxy transmitter 203 waits for reception of messages by both the main server and the sub server, compares both the messages received, and then transfers appropriate one of the messages to client ECU 100c or 100d. Transfer of the message from server ECU 100a or 100b is determined according to the service policy.

Proxy transmitter 203 may control whether to execute proxy transmission processing, according to the state information held by vehicle state holder 206.

Anomaly monitor 204 checks whether any anomaly has occurred in the service oriented communication. Anomaly monitor 204 determines whether any anomaly has been detected. Specific examples of anomalies include: stoppage of communication from server ECU 100a or 100b or communication from client ECU 100c or 100d that lasts for a predetermined period; and detection of a message that stops offer or subscription of a service from server ECU 100a or 100b or communication from client ECU 100c or 100b, a communication error, an anomaly alert by an intrusion detection system, a mismatch between an output by the main server and an output by the sub server at the time of the activation of the sub server. When anomaly monitor 204 determines that any of these events has been detected, anomaly monitor 204 determines that an anomaly has occurred in ECU 100a or 100b, and determines whether to switch to the sub server for safely keeping the offer of the service based on the vehicle state stored in vehicle state holder 206.

Service information holder 205 stores, in relation to each service, information about server EUC 100a or 100b, information about client EUC 100c or 100d, and a service policy. Details of service information are described later.

Vehicle state holder 206 holds state information indicating the state of a vehicle. Vehicle state holder 206 holds the state relating to driving by the vehicle that is one example of the state information, thereby holding information for determining whether to safely keep the service or stop the service. Details of vehicle states are described later.

[1.5 One Example of Application Authentication Information Stored in Application Authentication Information Holder]

FIG. 6A is a diagram indicating a first example of application authentication information stored in application authentication information holder 103. Specifically, the application authentication information indicated in FIG. 6A is application authentication information stored in application authentication information holder 103 of server ECU 100a that is the main server.

As illustrated in FIG. 6A, the application authentication information holds secret information indicating that the access authority (in other words, the authority as the server which offers a service) to the service.

A public key of a main server is a key for verifying the signature that is generated by a private key of the main server. Application unit 102 generates a signature for the public key, or the like of the sub server using the public key of the main server. Broker ECU 200 verifies the signature generated, thereby being able to assign the authority of the sub server having a redundant configuration from the main server.

A session key is used to encrypt the payload of a frame by being shared with broker ECU 200.

The public key of the sub server and the private key of the sub server are generated by the main server or are held in advance, and are used to assign the access authority to the service held by the main server to the sub server.

It is to be noted that when the sub server holds the public key of the sub server and the private key of the sub server, the public key of the sub server and the private key of the sub server do not need to be stored in application authentication information holder 103 of server 100a that is the main server.

A service authority certificate is generated by an application vender, a vehicle manufacturer, or the like, and indicates, for each service ID of a service, access authority to the service.

In FIG. 6A, the public key of the main server is 0x123456789 . . . , the private key of the main server is 0xabcdefabcdef . . . , the session key is 0xa787c89de989 . . . , the public key of the sub server is 0x1a2b3c4d5e6f . . . , and the private key of the sub server is 0xfedcba . . . . The service authority certificate indicates the server authority (also referred to as the authority as the server) to the service having the service ID of 10. The indication can be also said as indication that server ECU 100a is the holder of the authority as the server that offers the service is certified by the application vender, vehicle manufacturer, or the like.

Although a case where the application authentication information is held in the form of plaintext is indicated as an example in the embodiment, it is to be noted that the application authentication information may be encrypted and held. Alternatively, the application authentication information may be stored in secure memory from which it is impossible to directly read the application authentication information from application unit 102.

FIG. 6B is a diagram indicating a second example of application authentication information stored in application authentication information holder 103 in the embodiment. Specifically, the application authentication information indicated in FIG. 6B is application authentication information stored in application authentication information holder 103 of server ECU 100b that is the sub server.

The application authentication information indicated in FIG. 6B includes information except for the public key of the main server and the private key of the main server in the application authentication information indicated in FIG. 6A.

The items of information included in the application authentication information indicated in FIG. 6B are similar to the items of information included in the application authentication information indicated in FIG. 6A, and thus detailed descriptions thereof are omitted.

It is to be noted that the client ECUs also hold application authentication information similar to the application authentication information held by the server ECUs.

FIG. 6C is a diagram indicating a third example of application authentication information according to the embodiment. Specifically, the application authentication information indicated in FIG. 6C is application authentication information held by client ECU 100c or 100d.

As indicated in FIG. 6C, the application authentication information holds secret information indicating that the access authority (in other words, the authority as the client which is offered with a service) to the service is held.

The items of information included in the application authentication information indicated in FIG. 6C are similar to the items of information included in the application authentication information indicated in FIG. 6A, but are different in the point that the public key of the client and the private key of the client are included in replace for the public key of the main server and the private key of the main server, respectively. In addition, the service authority certificate indicates the client authority (also referred to as the authority as the client) to the service having the service ID of 10. The indication can be also said as indication that client ECU 100c or 100d is the holder of the authority as the client that is offered with the service is certified by the application vender, vehicle manufacturer, or the like.

[1.6 One Example of Service Policy Stored in Service Policy Holder]

FIG. 7 is a diagram indicating one example of a service policy stored in service policy holder 104. The service policy stores, for each service ID of a service, presence/absence of a sub server candidate and the address thereof if any, presence/absence of proxy transmission, a method of switching to a sub server having a redundant configuration at the time when an anomaly occurs, a switching polity indicating a state of a vehicle at the time of switching and the switching method, and a security policy.

The service having the service ID of 0x10 indicated in FIG. 7 is described.

In connection with the service ID of 0x10, it is indicated that a sub server candidate is "present", and that the ECU having the address of 192.168.1.XX is the sub server candidate. It is also indicated that proxy transmission is "present", and that the switching method is hot standby in which switching is possible when the sub server is also activated while the main server is activated. In addition, the switching policy is "anytime OK", and thus switching between server ECUs that offer the service is allowed regardless of the driving state of the vehicle. As the security policy, brokering and monitoring of an SD message are set.

The brokering of the SD message as the security policy is performed by broker ECU 200. Broker ECU 200 receives the Offer message that is normally broadcast. Broker ECU 200 verifies an appropriate server ECU and an appropriate client ECU, thereby being capable of preventing an attacker that is present on a network from obtaining information about the service ID in an unauthorized manner. By means of only the client ECU that is allowed to access the service transmitting a Find message to broker ECU 200 and being authenticated, broker ECU 200 performs access control so that information about the appropriate server ECU can be obtained.

Broker ECU 200 may encrypt the payload of the Offer message by the session key that is shared in advance at the time of brokering of the SD message. In this way, it is possible to prevent leakage of the information about the service ID even when there is an attacker that obtains a message on the network in an unauthorized manner.

The monitoring as the security policy is monitoring whether any anomaly has occurred in connection with the message of the service ID. In Ethernet (registered trademark), high-speed and large-volume communication occurs compared with the case of CAN. Thus, narrowing the monitoring targets makes it possible to efficiently monitor, for example, a message that affects safety while reducing the processing load that is placed on broker ECU 200.

Next, in connection with the service ID of 0x20, it is indicated that a sub server candidate is "present" (192.168.1.20), that proxy transmission is "absent", the switching method is any (that is, any of hot standby and cold standby is possible), and the switching policy allows only hot standby during driving. In addition, only SD brokering is set as the security policy.

Next, in connection with the service ID of 0x30, it is indicated that a sub server candidate is "present" (192.168.1.XX), that proxy transmission is "absent", the switching method is cold standby, and the switching policy allows switching between server ECUs only during driving. In addition, SD brokering is set to the security policy only at the initial registration.

By means of SD brokering being set only at the initial registration, there is no need for broker ECU 200 to transmit the SD via broker ECU 200, except for the time of initial registration. For this reason, when the above setting has been made, the server ECU and the client ECU can directly exchange messages for detecting a service, which increase realtimeliness of the communication. On the other hand, since the setting increases an occurrence risk of spoofing by an unauthorized ECU, the setting is appropriate for a service for which security is not required or a service for which realtimeliness is important.

[1.7 One Example of Service Information Stored in Service Information Holder]

FIG. 8A is a diagram indicating one example of service information stored in service information holder 205 in broker ECU 200. As indicated in FIG. 8A, the service information is set based on information included in a service policy that is notified from a server ECU or a client ECU. The service information includes, for each service ID of a service, the address and state of a main server, the address and state of a sub server, presence/absence of an anomaly in connection with the service, the address of the client ECU, and the service policy received from the server ECU (presence/absence of proxy transmission, a switching policy, and a security policy). The service policy is shared between server ECUs 100a and 100b and broker ECU 200. The other information may change according to the state of a network.

In FIG. 8A, the address of the main server that offers the service having the service ID of 0x10 is 192.168.1.10, the state of the main server is active, the address of the sub server is 192.168.1.20, the state of the sub server is active, occurrence of any anomaly is "absent", and the address of the client ECU is 192.168.1.30. The service policy is similar to the one in FIG. 7, and thus a description and indication thereof are omitted.

Next, the address of the main server that offers the service having the service ID of 0x20 is 192.168.1.10, the state of the main server is active, the address of the sub server is 192.168.1.20, the state of the sub server is stoppage, occurrence of any anomaly is "absent", and the address of the client ECU is 192.168.1.31. The service policy is not repeatedly indicated.

The address of the main server that offers the service having the service ID of 0x30 is 192.168.1.10, the state of the main server is active, the address of the sub server is 192.168.1.20, the state of the sub server is stoppage, occurrence of any anomaly is "absent", and any particular client ECU is not indicated. Since the service can be offered without requiring any authentication, it is indicated that broker ECU 200 does not manage any client ECU. The service policy is not repeatedly indicated.

[1.8 One Example of Access Control Information]

Figures 8B, 9:
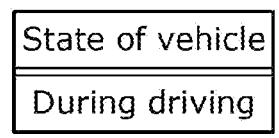
FIG. 8B is a diagram indicating one example of access control information according to the embodiment.
FIG. 9 is a diagram indicating one example of a vehicle state according to the embodiment.

FIG. 8B is a diagram indicating one example of access control information held in service manager 202 of broker ECU 200. The access control information indicated in FIG. 8B is information that is used by service manager 202 to determine whether it is appropriate to broker a frame received by communication controller 201. The access control information indicated in FIG. 8B is, as one example, information indicating, for each of frames that should be brokered, a combination of an identifier of a service, an identifier indicating a transmission source or a destination, and the type of the frame. Service manager 202 allows brokering of the frame that matches any of the combinations indicated in the access control information, and prohibits brokering of the frame that does not match any of the combinations indicated in the access control information.

The access control information indicated in FIG. 8B indicates, for each of the frames that should be brokered in the service having the service ID of 0x10, the combination of the identifier of the service, the identifier indicating the transmission source or the destination, and the type of the frame.

For example, it is indicated that the frame having the transmission source address of 192.168.1.10 (that is, the address of the main server) and having the frame type of Offer message should be brokered. It is also indicated that the frame having the transmission source address of 192.168.1.20 (that is, the address of the sub server) and having the frame type of Offer message should be brokered. It is also indicated that the frame having the transmission source address of 192.168.1.30 (that is, the address of the client ECU) and having the frame type of Offer message should be brokered.

It is also indicated that the frame having the transmission source address of 192.168.1.30 (that is, the address of the client ECU) and having the frame type of Find message should be brokered. It is also indicated that the frame having the transmission source address of 192.168.1.10 (that is, the address of the main server) and having the frame type of Find message should be brokered. It is also indicated that the frame having the transmission source address of 192.168.1.20 (that is, the address of the sub server) and having the frame type of Find message should be brokered.

It is to be noted that the columns in which "any" is indicated in the access control information indicated in FIG. 8B indicate that any address is possible.

It is also possible to use information indicating, for each of frames that should not be brokered, a combination of an identifier of a service, an identifier indicating a transmission source or a destination, and the type of the frame. In this case, service manager 202 prohibits brokering of the frame that matches any of the combinations indicated in the access control information, and allows brokering of the frame that does not match any of the combinations indicated in the access control information.

Although the access control information is indicated in the form of a table here, it is to be noted that access control information is not limited to be the one that is indicated in the form of the table. The access control information may have another form as long as the access control information is information based on which service manager 202 can make a determination similar to the determination described above. For example, the access control information may be expressed as an algorithm.

[1.9 One Example of Vehicle State Stored in Vehicle State Holder]

FIG. 9 is a diagram indicating one example of a vehicle state stored in vehicle state holder 206 in broker ECU 200. As indicated in FIG. 9, the state of the vehicle having the on-vehicle network is stored in Vehicle state.

FIG. 9 indicates that the vehicle state is during driving. The driving state of the vehicle can be notified from another ECU to broker ECU 200 via the on-vehicle network.

By means of broker ECU 200 recognizing the vehicle state, it becomes possible to broker a message in service oriented communication or control timing for switching to the sub server, according to the characteristics of the service.

Although the embodiment indicates the example in which the vehicle state is during driving, vehicle states are not limited thereto. Vehicle states can include, for example, states as to whether the vehicle is driving such as stopped, during driving, driving at high speed, etc. In addition, a state as to whether a particular function operates may be added to the vehicle state. Examples of such functions include an automatic driving function, cruising control, an automatic parking function, or an automatic emergency braking, etc. In addition, a state relating to electric power such as charging or discharging of the vehicle may be added.

For example, when the vehicle state is the automatic driving function, the importance of realtimeliness (or security) of a particular service increases. Thus, broker ECU 200 becomes capable of increasing realtimeliness or security by switching presence/absence of proxy transmission. Specifically, broker ECU 200 is capable of increasing realtimeliness by setting proxy transmission to "absent" in order to allow the server ECU and the client ECU to perform communication directly. In addition, broker ECU 200 is capable of increasing security by setting proxy transmission to "present" in order to allow broker ECU 200 to verify a message.

In addition, a continuous operation may be required depending on a service, and even when an anomaly has occurred in the main server, making the sub server be in a standby state enables seamless switching to the sub server and increase in robustness. In such a service, in order to give importance to safety, broker ECU 200 may switch to the sub server only when the vehicle state indicates that the vehicle is stopped or a particular function of the vehicle is stopped.

[1.10 Sequence of Service Information Registration by Broker ECU]

FIG. 10 is a diagram indicating a sequence of service information registration that is performed by broker ECU 200 according to the embodiment.

FIG. 10 indicates a sequence until when a service is detected by means of broker ECU 200 brokering communication between server ECU 100a and client ECU 100c. At this time, broker ECU 200 updates the service information.

Specifically, broker ECU 200 executes the processing indicated below.

In other words, communication controller 201 receives an Offer message including first service information indicating the service to be offered from server ECU 100a before offer of the service. In addition, communication controller 201 receives a Find message including second service information indicating a service find target from client ECU 100c before the offer of the service. Service manager 202 causes communication controller 201 to transmit the Offer message to client ECU 100 which is the transmission source of the Find message received. The Find message includes the first service information identical to the second service information included in the Find message received by communication controller 201. Here, the Offer message corresponds to a service offer frame, and the Find message corresponds to a service find frame.

The above processing is described in detail below.

In Step S101, server ECU 100a transmits, to broker ECU 200, the Offer message including information indicating a service that server ECU 100a itself offers (also simply denoted as "Offer"). At this time, server ECU 100a includes, in the Offer message, a service authority certificate (see FIG. 6A) indicating access authority relating to the service and information relating to a service policy, and transmits the Offer message.

In Step S102, broker ECU 200 receives the Offer message transmitted by server ECU 100a in Step S101, verifies the service authority certificate, and confirms that server ECU 100a has the authority as the server for the service. Broker ECU 200 determines that the Offer frame is valid when the verification has been successfully completed.

In Step S103, broker ECU 200 updates the service information, based on information (IP address, port number, etc.) of server ECU 100a and the service policy included in the Offer message transmitted by server ECU 100a in Step S101.

In Step S104, client ECU 100c transmits the Find message including information about the service to be desired to be offered (also simply denoted as "Find") to broker ECU 200. At this time, client ECU 100c includes, in the Find message, the Find message in the service authority certificate (see FIG. 6C) indicating that client ECU 100c has the client authority for the service desired to be offered, and transmits the Find message.

In Step S105, broker ECU 200 receives the Find message transmitted by client ECU 100c in Step S104, verifies the service authority certificate, and confirms that client ECU 100c has the authority as the client for the service. Broker ECU 200 determines that the Find frame is valid when the verification has been successfully completed.

In Step S106, broker ECU 200 adds information about the client to the service information.

In Step S107, broker ECU 200 transmits the Offer message to client ECU 100c. At this time, when proxy transmission of the service is "present", broker ECU 200 transmits the Offer message to client ECU 100c, by setting broker ECU 200 as the service offerer. When proxy transmission is "absent", broker ECU 200 transmits the Offer message to client ECU 100c, by setting client ECU 100c as the service offerer.

In Step S108, client ECU 100c receives the Offer message transmitted by broker ECU 200 in Step S107, and registers server information based on the Offer message received.

[1.11 Communication Sequence in the Case of Only SD Brokering by Broker ECU 200]

Figure 11A:
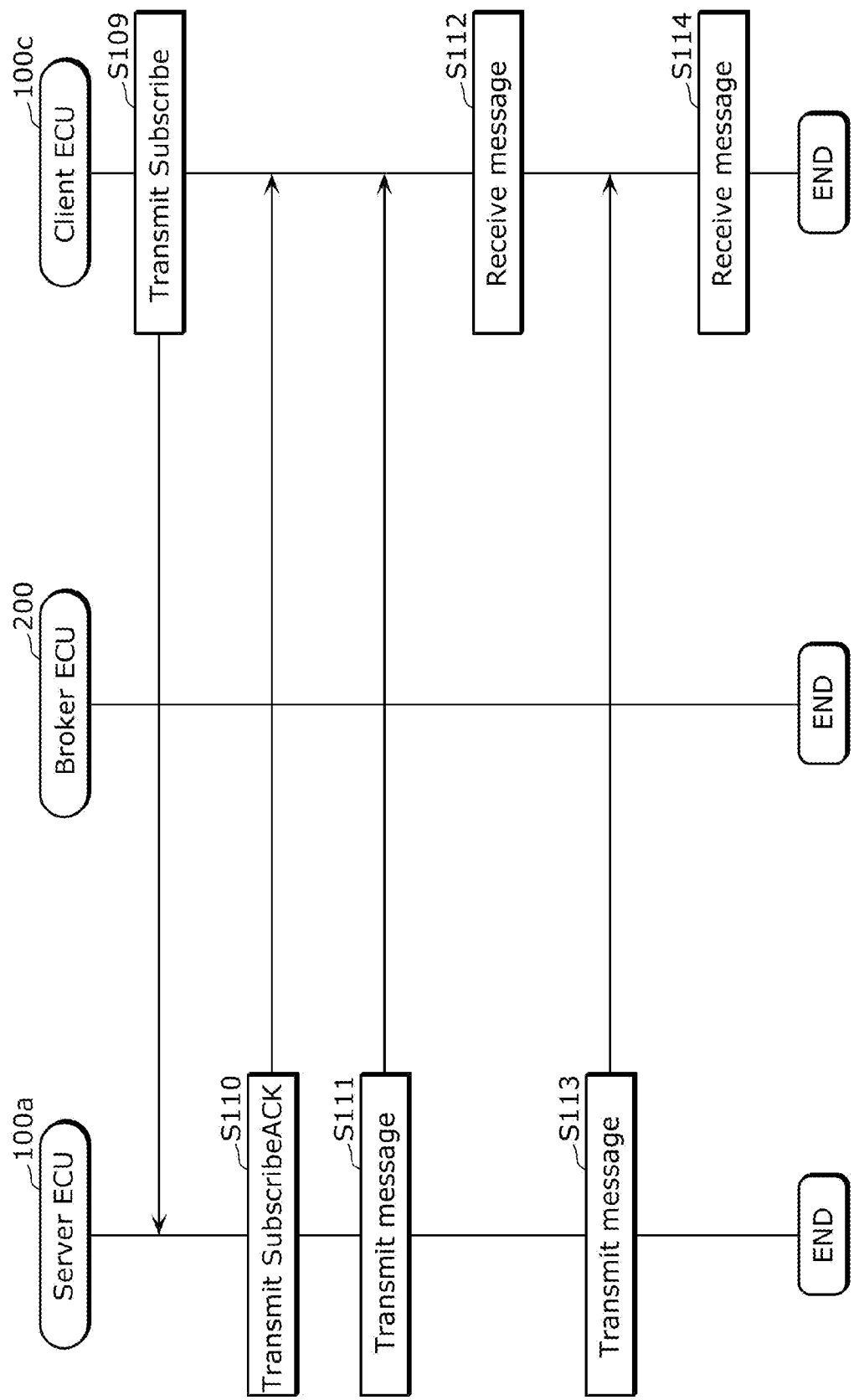
FIG. 11A is a diagram indicating a communication sequence for a service in which only SD brokering is performed according to the embodiment.

FIG. 11A is a diagram indicating a communication sequence for a service in which only SD brokering is performed according to the embodiment.

FIG. 11A indicates one example of a communication sequence in the case where the security policy for broker ECU 200 is set to SD brokering only and proxy transmission is set to "absent". It is to be noted that the sequence indicated in FIG. 11A indicates a sequence after SD brokering indicated in FIG. 10 is completed.

In Step S109, client ECU 100c transmits a Subscribe message of the service to server ECU 100a based on the server information registered. The Subscribe message transmitted is transferred to server ECU 100a by being received by one port of communication controller 201 of broker ECU 200 and being transmitted from another port of communication controller 201. In this way, the message that is transmitted from client ECU 100c to server ECU 100a via broker ECU 200 is transferred by the reception and transmission by the ports of communication controller 201 of broker ECU 200. This also applies to the following description.

In Step S110, server ECU 100a receives the Subscribe message transmitted by client ECU 100c in Step S109, and delivers a SubscribeAck message back to client ECU 100c. The SubscribeAck message transmitted is transferred to client ECU 100c by being received by one port of communication controller 201 of broker ECU 200 and being transmitted from another port of communication controller 201. In this way, the message that is transmitted from client ECU 100c to server ECU 100a via broker ECU 200 is transferred by the reception and transmission by the ports of communication controller 201 of broker ECU 200. This also applies to the following description.

In Step S111, server ECU 100a transmits a SOME/IP message for offering the service to client ECU 100c.

In Step S112, client ECU 100c receives the SOME/IP message transmitted by ECU 100a in Step S111.

In Step S113, server ECU 100a transmits the SOME/IP message after a predetermined period elapses from reception of the SOME/IP message in Step S112.

In Step S114, client ECU 100c receives the message transmitted by server ECU 100a in Step S113. After Step S114, communication between server ECU 100a and client ECU 100c continues.

[1.12 Communication Sequence in the Case where Proxy Transmission is Performed by Broker ECU 200]

Figure 11B:
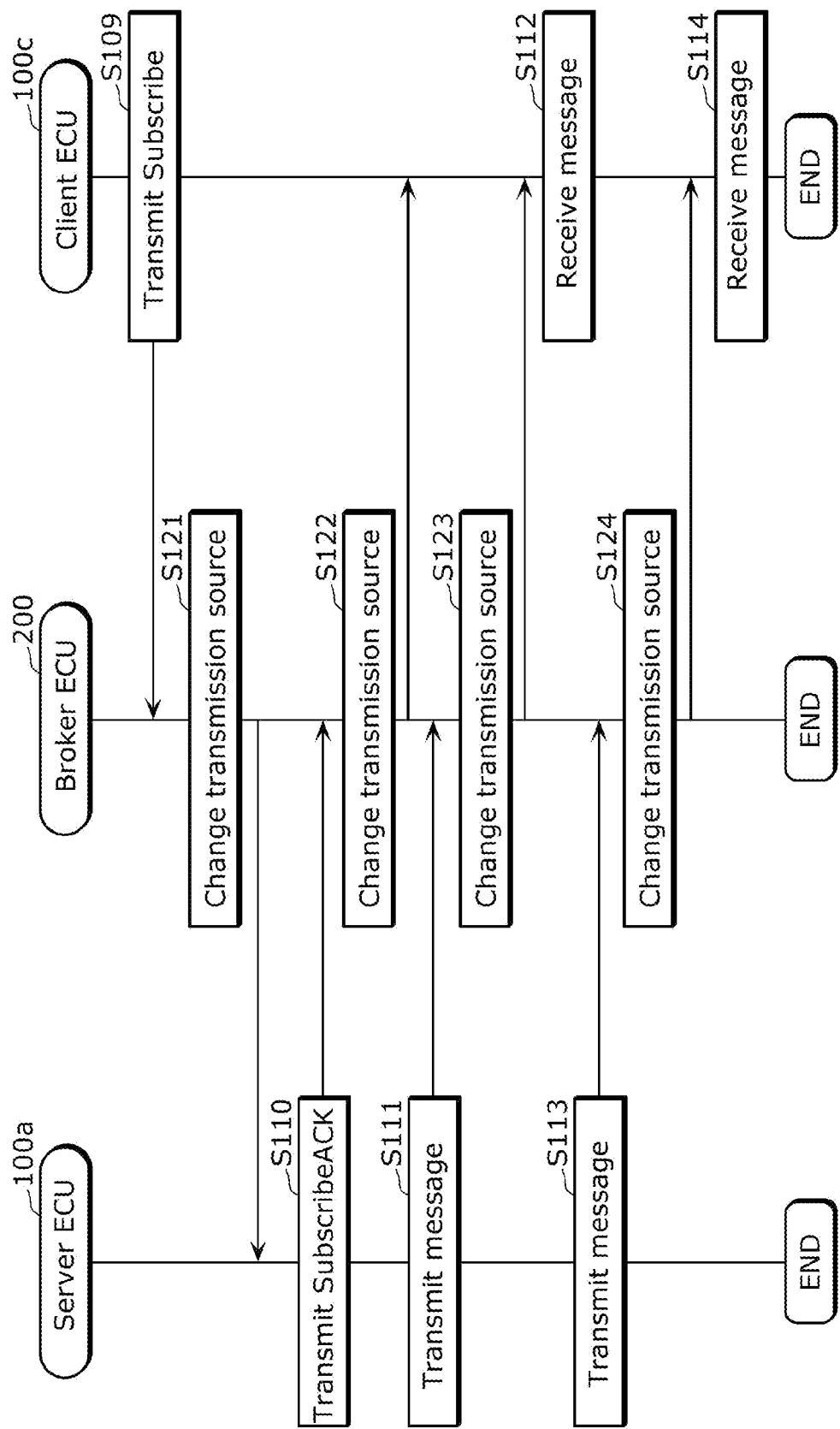
FIG. 11B is a diagram indicating a communication sequence for a service in which proxy transmission is performed according to the embodiment.

FIG. 11B is a diagram indicating a communication sequence for a service in which proxy transmission is performed according to the embodiment.

FIG. 11B indicates one example of a communication sequence in the case where proxy transmission by broker ECU 200 is set to "present". It is to be noted that the sequence indicated in FIG. 11B indicates a sequence after SD brokering indicated in FIG. 10 is completed.

In FIG. 11B, the same processes as the processes in FIG. 11A are assigned the same reference signs, and detailed description thereof are omitted.

In Step S121, proxy transmitter 203 of broker ECU 200 receives a Subscribe message transmitted by client ECU 100c in Step S109, changes the IP address of the transmission source (that is, the service receiver) of the Subscribe message received to the IP address of broker ECU 200, and transmits the Subscribe message after the change to server ECU 100a. It is to be noted that, in Step S121, the IP address of the server side may be changed, and the IP address of the client side may not be changed. It is to be noted that, in Step S121, the IP address of the client side may be changed, and the IP address of the server side may not be changed. It is to be noted that an optional identifier may be used in replace for the IP address. This also applies to the following description.

In Step S122, proxy transmitter 203 of broker ECU 200 receives the SubscribeAck message transmitted by server ECU 100a in Step S110, changes the IP address of the transmission source (that is, the service offerer) of the SubscribeACK message received to the IP address of broker ECU 200, and transmits the SubscribeACK message after the change to client ECU 100c.

In Step S123, proxy transmitter 203 of broker ECU 200 receives the message transmitted by server ECU 100a in Step S111, changes the transmission source (that is the service offerer) of the message received to broker ECU 200, and transmits the message after the change to client ECU 100c.

In Step S124, proxy transmitter 203 of broker ECU 200 receives the message transmitted by server ECU 100a in Step S113, changes the transmission source (that is the service offerer) of the message received to broker ECU 200, and transmits the message after the change to client ECU 100c.

[1.13 Registration Sequence at the Time when Hot Standby of Sub Server is Started]

FIG. 12 is a diagram indicating a sequence of sub server registration by broker ECU 200 according to the embodiment. FIG. 12 indicates the sequence of sub server registration that is performed when server ECU 100b which is the sub server performs hot standby.

It is to be noted that the processing indicated in FIG. 12 can be said as processing that is performed when server ECUs 100a and 100b start to have a redundant configuration.

In Step S201, server ECU 100a which is the main server transmits a sub server activation message to server 100b which is the sub server. At this time, server ECU 100a includes, in the sub server activation message, a sub server certificate indicating that the sub server authority for the service has been given by the main server.

In Step S202, server ECU 100b receives the sub server activation message transmitted by server ECU 100a in Step S201, and activates an application that offers a service corresponding to the sub server activation message received.

In Step S203, server ECU 100b which is the sub server transmits the Offer message to broker ECU 200. At this time, server ECU 100b includes authentication information indicating that the sub server authority is held into the Offer message, and transmits the Offer message.

In Step S204, broker ECU 200 receives the Offer message transmitted by server ECU 100b in Step S203, and verifies the service information included in the Offer message received against the authentication information.

In Step S205, broker ECU 200 updates the state of the sub server indicated in the service information to "active", and registers the address of the sub server.

[1.14 Communication Sequence in the Case Where Proxy Transmission Is Present]

FIG. 13 is a diagram indicating a communication sequence in proxy transmission by broker ECU 200 according to the embodiment. FIG. 13 indicates the communication sequence relating to a service for which proxy transmission by broker ECU 200 is set to "present". It is to be noted that the sequence indicated in FIG. 13 indicates a sequence after the service information registration sequence in FIG. 10 and the sub server activation sequence in FIG. 12 are completed.

In FIG. 13, server ECUs 100a and 100b have a redundant configuration.

In addition, it is assumed that client ECU 100c has transmitted a Subscribe message to broker ECU 200, and broker ECU 200 as the client ECU transmits the Subscribe message to server ECUs 100a and 100b, and that a session between client ECU 100c and broker ECU 200 and a session between server ECUs 100a and 100b and broker ECU 200 have been established.

In Step S206, server ECU 100a which is the main server transmits the message having the service ID of 10 to broker ECU 200. Broker ECU 200 receives the message transmitted, and enters a standby state for a predetermined period.

In Step S207, server ECU 100b which is the sub server transmits the message having the service ID of 10 to broker ECU 200 in the same manner as described above.

In Step S208, broker ECU 200 compares the message received from server ECU 100a which is the main server in Step S206 and the message received from server ECU 100b which is the sub server in Step S207. The comparison between the messages by broker ECU 200 is made by, for example, verifying whether the payloads included in the messages match, or whether the difference between the payloads falls within a predetermined error range.

In Step S209, broker ECU 200 as the server ECU transmits the message having the service ID of 10 to client ECU 100c. The message transmitted at this time may be a message that has been received from server ECU 100a which is the main server and has been transferred. Alternatively, the message may be a message that has been received from server ECU 100b which is the sub server and has been transferred. However, in the cases such as a case where a mismatch has occurred in the message received from server ECU 100a, broker ECU 200 may discard the message. In addition, in the case where a message has been received only from the main server or the sub server in a predetermined period, broker ECU 200 may transfer the payload included in the message received as it is. Details are described with reference to FIG. 14.

In Step S210, client ECU 100c receives the message transmitted by ECU 200 in Step S209.

[1.15 Communication Sequence in the Case where Anomaly has Occurred in Proxy Transmission]

Figure 14:
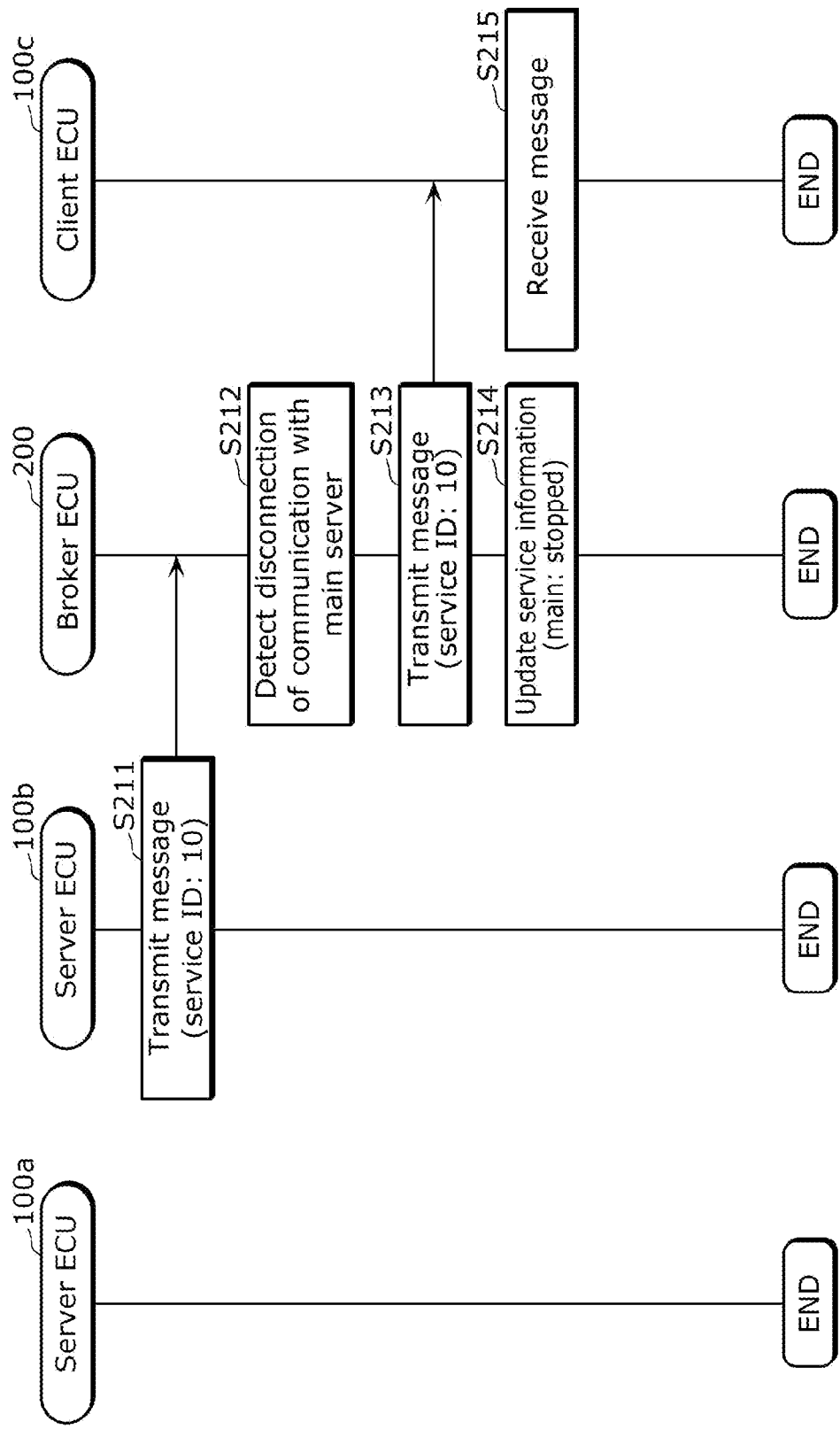
FIG. 14 is a diagram indicating a communication sequence for proxy transmission that is performed in the case where an anomaly has occurred, according to the embodiment.

FIG. 14 is a diagram indicating a communication sequence for proxy transmission that is performed in the case where an anomaly has occurred, according to the embodiment. FIG. 14 indicates the communication sequence in the case where a communication anomaly has occurred in connection with a service for which proxy transmission by broker ECU 200 is set to "present". It is to be noted that the sequence indicated in FIG. 14 indicates a sequence after the service information registration sequence in FIG. 10 and the sub server activation sequence in FIG. 12 are completed.

In addition, it is assumed that client ECU 100c has transmitted a Subscribe message to broker ECU 200, and broker ECU 200 as the client ECU transmits the Subscribe message to server ECUs 100a and 100b, and that a session between client ECU 100c and broker ECU 200 and a session between server ECUs 100a and 100b and broker ECU 200 have been established.

In FIG. 14, server ECUs 100a and 100b have a redundant configuration.

In Step S211, server ECU 100b transmits the message having the service ID of 10 to broker ECU 200. Broker ECU 200 receives the message transmitted, and enters a standby state for a predetermined period.

In Step S212, broker ECU 200 detects disconnection of the communication with sever ECU 100a which is the main server. Broker ECU 200 detects the disconnection of the communication with sever ECU 100a by detecting that no message from server ECU 100a which is the main server has been received in a standby state that lasts for a predetermined period.

In Step S213, broker ECU 200 transmits the message having the service ID of 10 to client ECU 100c, based on the message of server ECU 100b which is the sub server.

It is to be noted that broker ECU 200 may control whether to transmit the message according to the type of the service. Alternatively, broker ECU 200 may control whether to transmit the message according to state information indicating the state of the vehicle.

In Step S214, broker ECU 200 updates the service information to information indicating that occurrence of an anomaly is "present", and updates the state of the main server to "stopped". In addition, broker ECU 200 may execute predetermined processing that is performed when an anomaly has occurred in the sub server. The above update processing may be included in the predetermined processing.

In Step S215, client ECU 100c receives a message.

[1.16 Sequence of Switching to Sub Server at the Time of Anomaly Has Occurred]

Figure 15:
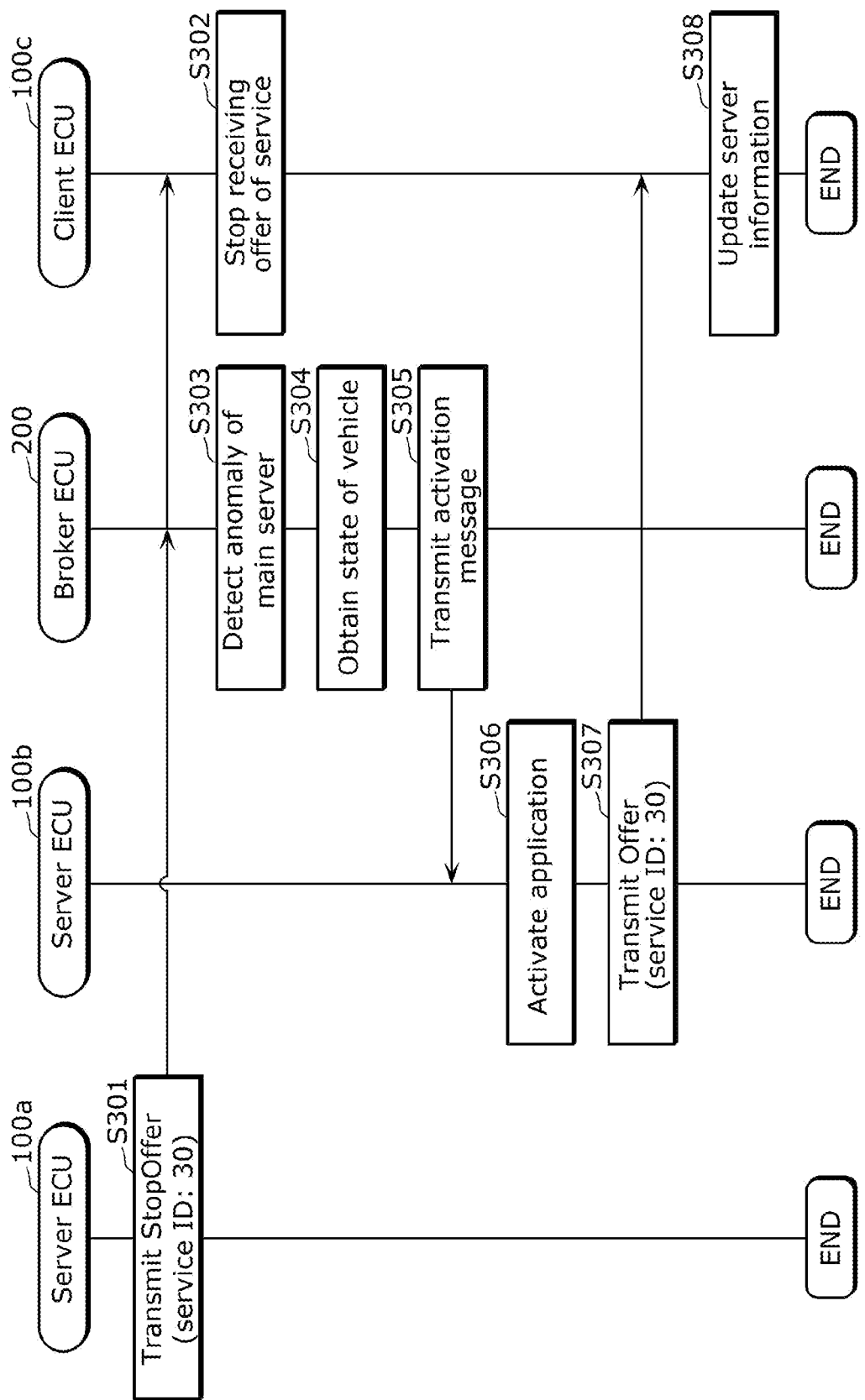
FIG. 15 is a diagram indicating a sequence of switching to a sub server that is performed in the case where an anomaly has occurred, according to the embodiment.

FIG. 15 is a diagram indicating a sequence of switching to a sub server that is performed in the case where an anomaly has occurred, according to the embodiment. FIG. 15 indicates a sequence at the time of continuing offer of a service by detecting an anomaly in server ECU 100a and switching to the sub server. It is to be noted that the sequence indicated in FIG. 15 indicates a sequence after SD brokering indicated in FIG. 10 is completed. In addition, it is assumed that a vehicle state is "stopped".

In FIG. 15, server ECUs 100a and 100b have a redundant configuration.

In Step S301, server ECU 100a broadcasts a StopOffer message (also simply denoted as "StopOffer") when stopping the offer of the service due to any cause, thereby causing client ECU 100c to receive the StopOffer message.

In Step S302, client ECU 100c stops the reception of the service in response to the reception of the StopOffer message in Step S301.

In Step S303, broker ECU 200 detects that an anomaly has occurred in server ECU 100a which is the main server, based on the reception of the StopOffer message.

In Step S304, broker ECU 200 obtains a current state of the vehicle in order to perform server switching.

In Step S305, when the state of the vehicle is "stopped", broker ECU 200 determines that server switching is possible, and transmits an activation message which is a message for activating the sub server based on the service information to server ECU 100b. In addition, broker ECU 200 determines that server switching is impossible when the state of the vehicle is "driving", and ends the processing.

In Step S306, server ECU 100b activates an application for offering the service having the service ID of 30 in response to reception of the activation message transmitted by broker ECU 200.

In Step S307, server ECU 100b broadcasts the Offer message, thereby notifying client ECU 100c of the server information.

In Step S308, client ECU 100c updates the server information to server information about server ECU 100b which is the sub server in response to reception of the Offer message in Step S307. In this way, client ECU 100c becomes able to be offered with the service having the service ID of 30 which has been stopped in Step S301.

[1.17 Flow Chart of SD Processing by Broker ECU]

Figure 16:
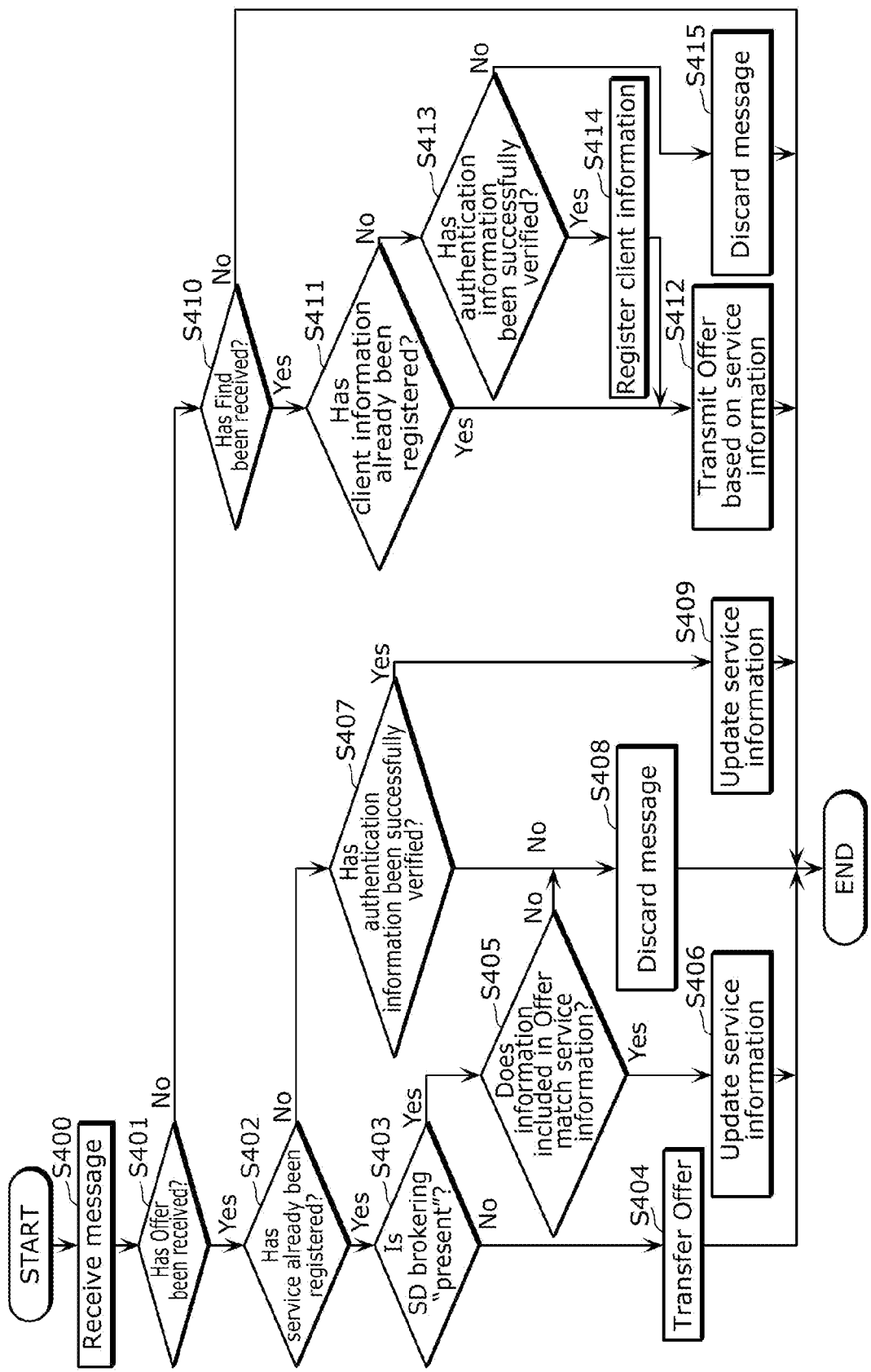
FIG. 16 is a flow chart indicating processing that is performed on an SD message by the broker ECU according to the embodiment.

FIG. 16 is a flow chart indicating processing that is performed on an SD message by broker ECU 200 according to the embodiment.

In Step S400, broker ECU 200 receives a message from server ECU 100a or 100b, or client ECU 100c or 100d.

In Step S401, broker ECU 200 determines whether or not the message received in Step S400 is an Offer message. Broker ECU 200 executes Step S402 when determining that the message is an Offer message, and executes Step S410 when determining that the message is not an Offer message.

In Step S402, broker ECU 200 determines whether or not service information relating to the Offer message received in Step S400 is of a service that has been already registered in service information holder 205 of broker ECU 200. Broker ECU 200 executes Step S403 when the service is an already registered service. Otherwise, broker ECU 200 executes Step S407.

In Step S403, when the service relating to the Offer message received in Step S400 has already been registered in service information holder 205, broker ECU 200 checks presence or absence of brokering by SD on the corresponding service held in service information bolder 205. When SD brokering is "present", broker ECU 200 executes Step S405. Otherwise, broker ECU 200 executes Step S404.

In Step S404, broker ECU 200 transfers the Offer message received in Step S400 according to header information.

In Step S405, broker ECU 200 determines whether or not information included in the Offer message received in Step S400 matches service information stored in service information holder 205. Specifically, broker ECU 200 determines whether or not the service ID included in the Offer message matches the service ID of the server included in the service information.

Broker ECU 200 executes Step S406 when determining that the information included in the Offer message matches the service information. Otherwise, broker ECU 200 executes Step S408.

In Step S406, broker ECU 200 updates the service information based on the information included in the Offer message received in Step S400, and ends the processing.

In Step S407, broker ECU 200 verifies authentication information included in the Offer message received in Step S400, and determines whether or not the authentication information has been successfully verified. Broker ECU 200 executes Step S409 when the authentication information has been successfully verified. Otherwise, broker ECU 200 executes Step S408.

In Step S408, broker ECU 200 discards the Offer message received in Step S400.

In Step S409, broker ECU 200 updates the service information stored in service information holder 205 based on the service policy included in the Offer message received in Step S400, and ends the processing.

In Step S410, broker ECU 200 determines whether or not the message received in Step S400 is a Find message. When determining that the message is a Find message, broker ECU 200 executes Step S411. Otherwise, broker ECU 200 ends the processing.

In Step S411, broker ECU 200 determines whether or not information about the client ECU that is the transmission source of the Find message received in Step S400 is registered in service information holder 205. When determining that information about the client ECU is registered, broker ECU 200 executes Step S412. Otherwise, broker ECU 200 executes Step S413.

In Step S412, broker ECU 200 transmits the Offer message including the server information to the client ECU based on the service information.

In Step S413, broker ECU 200 verifies authentication information included in the Find message received in Step S400, and determines whether or not the authentication information has been successfully verified. Broker ECU 200 executes Step S414 when the authentication information has been successfully verified. Otherwise, broker ECU 200 executes Step S415.

In Step S414, broker ECU 200 registers client information into service information stored in service information holder 205, and executes Step S412.

In Step S415, broker ECU 200 discards the Find message received in Step S400.

Although the server information is updated when the determination regarding matching of service information has been successful in this embodiment (Step S406), it is to be noted that verification of the authentication information is performed (Step S407) instead of determination of matching of service information (Step S405), and the server information may be updated when the authentication information has been successfully verified.

[1.18 Flow Chart of Message Transmission Processing by Broker ECU]

Figure 17:
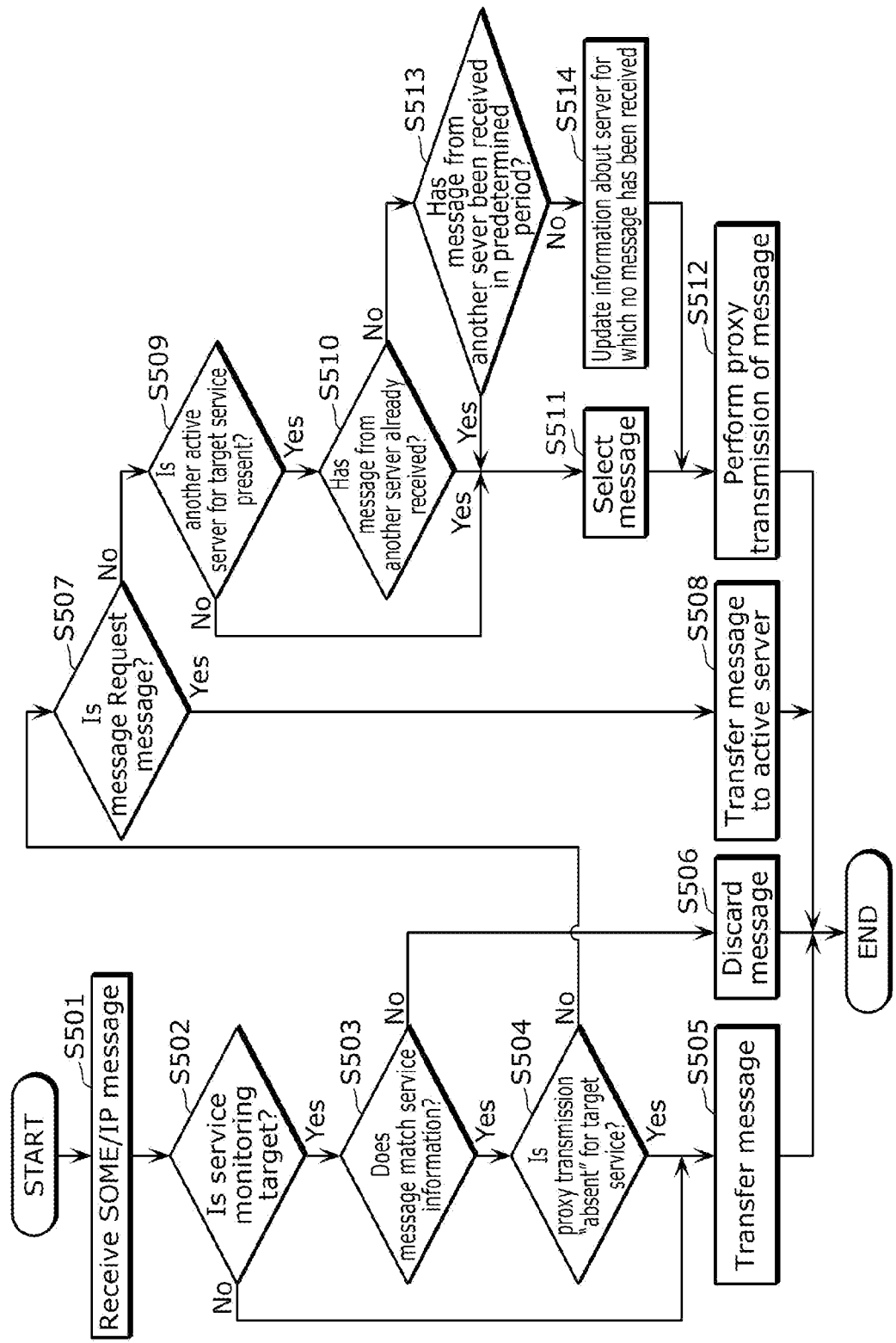
FIG. 17 is a flow chart indicating processing that is performed on a SOME/IP message by the broker ECU according to the embodiment.

FIG. 17 is a flow chart indicating processing on a SOME/IP message (specifically, a SOME/IP message other than any SD message) by broker ECU 200.

In Step S501, broker ECU 200 receives a SOME/IP message other than any SD message.

In Step S502, broker ECU 200 determines whether or not the service corresponding to the message received in Step S501 is a monitoring target. Broker ECU 200 executes Step S503 when determining that the service is a monitoring target. Otherwise, broker ECU 200 executes Step S505.

In Step S503, broker ECU 200 determines whether or not the message received in Step S501 matches the service information stored in service information holder 205. Specifically, when the message received in Step S501 is a message (a Notification or a Response) that is transmitted from a server, broker ECU 200 determines whether or not the transmission source of the message matches the registered server information and the destination of the message matches the registered client information. When the message received in Step S501 is a message (a Request or a Request no Response) that is transmitted from the client, broker ECU 200 determines whether or not the transmission source of the message matches the registered client information and the destination of the message matches the registered server information. Broker ECU 200 executes Step S504 when determining that the message matches the service information, and executes Step S506 when determining that the message does not match the service information.

In Step S504, broker ECU 200 obtains presence or absence of proxy transmission of a target service with reference to service information stored in service information holder 205. When proxy transmission is "absent", broker ECU 200 executes Step S505. When proxy transmission is "present", broker ECU 200 executes Step S507.

In Step S505, broker ECU 200 transfers the received message.

In Step S506, broker ECU 200 discards the received message.

In Step S507, broker ECU 200 determines whether the type of the received message is Request when the service of the received message is a service in which proxy transmission is "present". When the type of the received message is Request, broker ECU 200 executes Step S508. When the type of the received message is not Request, broker ECU 200 executes Step S509.

In Step S508, broker ECU 200 refers to the service information that is stored in service information holder 205, transfers the received Request message to an active server, and ends the processing. At this time, broker ECU 200 rewrites the transmission source included in the Request message with broker ECU 200, and then transfers the Request message.

In Step S509, broker ECU 200 regards the message received in Step S501 as a message that has been transmitted from a server, and determines whether or not there is any other active server for the target service. At this time, broker ECU 200 makes the above determination by referring to the service information that is stored in service information holder 205. When determining that there is no other active server, broker ECU 200 executes Step S511. When there is any other active server, broker ECU 200 executes Step S510.

In Step S510, broker ECU 200 determines whether or not any message from any other active server has already been received. As for message reception check, for example, it is determined that a message received from a server is stored in advance for a predetermined period, and the message reception check is performed by determining whether or not any message from the any other active server is present in the stored message. When broker ECU 200 has received a message from any other active server ECU, broker ECU 200 executes Step S511. Otherwise, broker ECU 200 executes Step S513.

In Step S511, broker ECU 200 selects a message. Examples of conceivable message selection methods include: a method of preferentially selecting a message from the main server; a method of preferentially selecting a message that has been received most recently; a method of comparing a plurality of messages and preferentially selecting a message corresponding to a median value or a message closer to the median value.

In Step S512, broker ECU 200 performs proxy transmission of a message.

In Step S513, broker ECU 200 waits for a predetermined period, and determines whether or not to receive a message from another active server ECU.

In Step S514, broker ECU 200 determines that an anomaly has occurred in a server, and update, to stoppage, the server information of the server which is active but has not received a message in the whole server information held in service information holder 205.

[1.19 Flow Chart of Switching at the Time of Detection of Communication Anomaly in Main Server]

Figure 18:
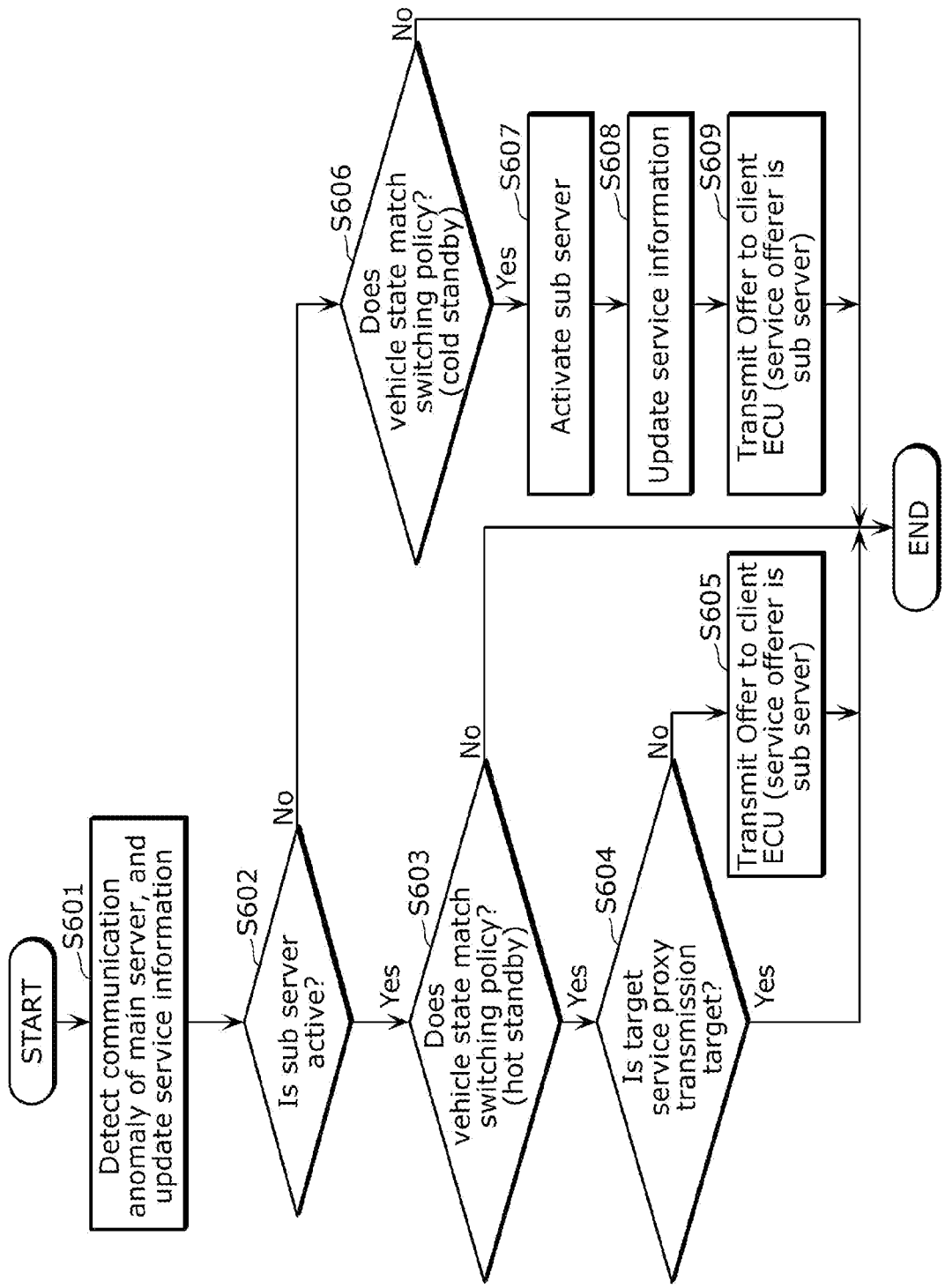
FIG. 18 is a flow chart indicating server switching processing that is performed in the case where a communication anomaly in a main server has been detected, according to the embodiment.

FIG. 18 is a flow chart indicating server switching processing that is performed in the case where a communication anomaly in the main server has been detected, according to the embodiment.

In Step S601, broker ECU 200 detects a communication anomaly of the main server, and updates information about the main server in the whole service information stored in service information holder 205 and anomaly detection information. The communication anomaly of the main server can be detected by, for example, notification of an error message from the main server, notification of a StopOffer message, communication disconnection for a predetermined period, or the like.

In Step S602, broker ECU 200 determines whether or not a sub server is active by referring to the service information stored in service information holder 205. When determining that the sub server is active, broker ECU 200 executes Step S603. Otherwise, broker ECU 200 executes Step S606.

In Step S603, broker ECU 200 determines whether or not the vehicle state matches the switching policy (hot standby) by referring to the vehicle state stored in vehicle state holder 206 and the service policy included in the service information. When determining that the vehicle state matches the switching policy, broker ECU 200 executes Step S604. Otherwise, broker ECU 200 ends the processing without executing further processing.

In Step S604, broker ECU 200 obtains presence or absence of proxy transmission of the target service. When the target service is a service in which proxy transmission is "present", broker ECU 200 ends the processing without executing further processing. In other words, the sub server continues the service. When the target service is a service in which proxy transmission is "absent", broker ECU 200 executes Step S605.

In Step S605, broker ECU 200 notifies switching between server ECUs by transmitting, to the client ECU, an Offer message including information about the sub server as the offerer of the service, and ends the processing.

In Step S606, broker ECU 200 checks whether or not the vehicle state matches the switching policy (cold standby). When the vehicle state matches the switching policy (cold standby), broker ECU 200 executes Step S607. Otherwise, broker ECU 200 ends the processing.

In Step S607, broker ECU 200 activates the sub server. The activation of the sub server is performed by, for example, activating the application which offers the service by transmitting a requested message to the sub server.

In Step S608, broker ECU 200 updates the service information of service information holder 205 by verifying authentication information based on an Offer message that is transmitted after the activation of the sub server and obtaining the server information.

In Step S609, broker ECU 200 transmits, to the client ECU, the Offer message including information about the sub server as the offerer of the service.

[1.20 Effects of the Embodiment]

The on-vehicle network system according to the embodiment, broker ECU 200 verifies whether a current ECU is an authorized server or client by means of broker ECU 200 verifying authentication information in connection with SOME/IP SD communication. This enables management of lack of a right for accessing the service by an unauthorized ECU to prevent spoofing by the unauthorized ECU, which increases security.

Furthermore, broker ECU 200 updates the brokering method for service oriented communication according to the service policy. In this way, as for a message for which high security is required, it is possible to keep the server information secret while monitoring the message regarding the service by means of broker ECU 200 performing monitoring and proxy transmission. In addition, as for a message for which realtimeliness is highly required, it is possible to maintain realtimeliness while increasing security by performing brokering only at the time of detection of a service.

Furthermore, broker ECU 200 selects a method of switching to a sub server when an anomaly has occurred in the offerer of the service according to the service policy and the vehicle state. In this way, it is possible to increase robustness of the service with consideration of the influence that the service places on the driving of the vehicle depending on the type of the service.

Variations of the Embodiment

A description is given of a service broker which appropriately performs access control for communication relating to offer of a service according to a variation of the embodiment.

Figure 19A:
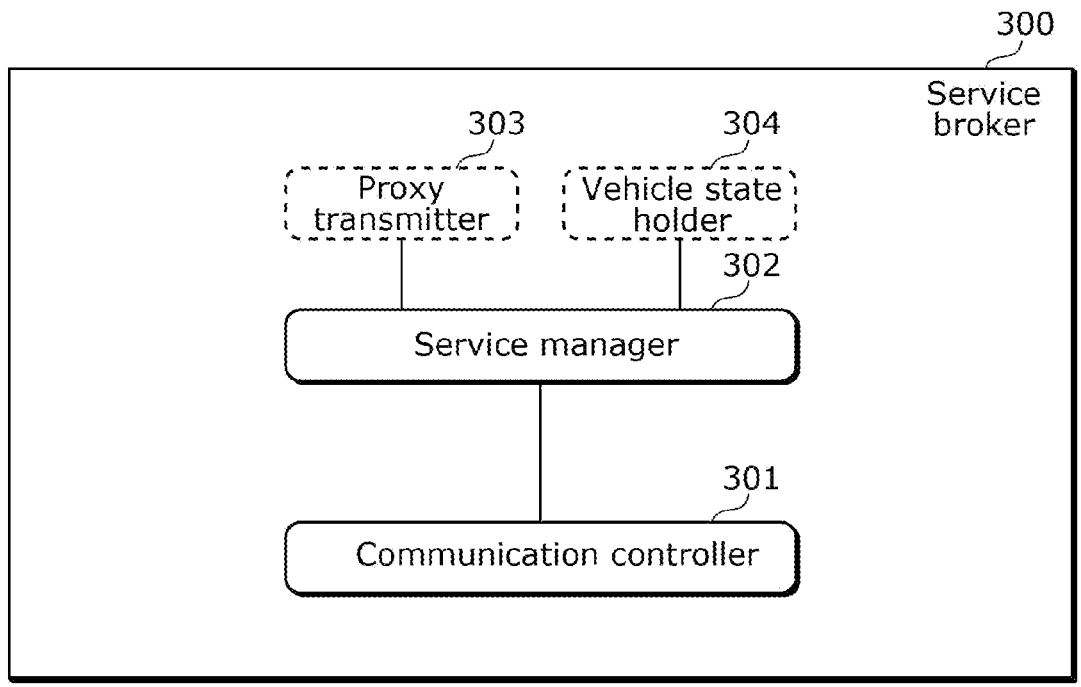
FIG. 19A is a diagram illustrating a configuration of a service broker according to a variation of the embodiment.

FIG. 19A is a diagram illustrating a configuration of service broker 300 according to the variation of the embodiment. Service broker 300 corresponds to broker ECU 200 according to the embodiment.

As illustrated in FIG. 19A, service broker 300 includes communication controller 301 and service manager 302.

Communication controller 301 is, in a service offer system which offers a service by service oriented communication from the server unit to the client unit, connected to each of the server unit and the client unit in the service offer system, and receives a frame to be used for offer of the service from the server unit or the client unit. Communication controller 301 corresponds to communication controller 201 according to the embodiment.

Service manager 302 determines whether the combination of the identifier of the service included in the frame received by communication controller 301, the identifier indicating the transmission source or the destination of the frame, and the type of the frame, and outputs the result of the determination. Service manager 302 corresponds to service manager 202 according to the embodiment.

It is to be noted that service broker 300 may include proxy transmitter 303 corresponding to proxy transmitter 203 included in broker ECU 200 according to the embodiment.

In addition, service broker 300 may include vehicle state holder 304 corresponding to vehicle state holder 206 included in broker ECU 200 according to the embodiment.

Figure 19B:
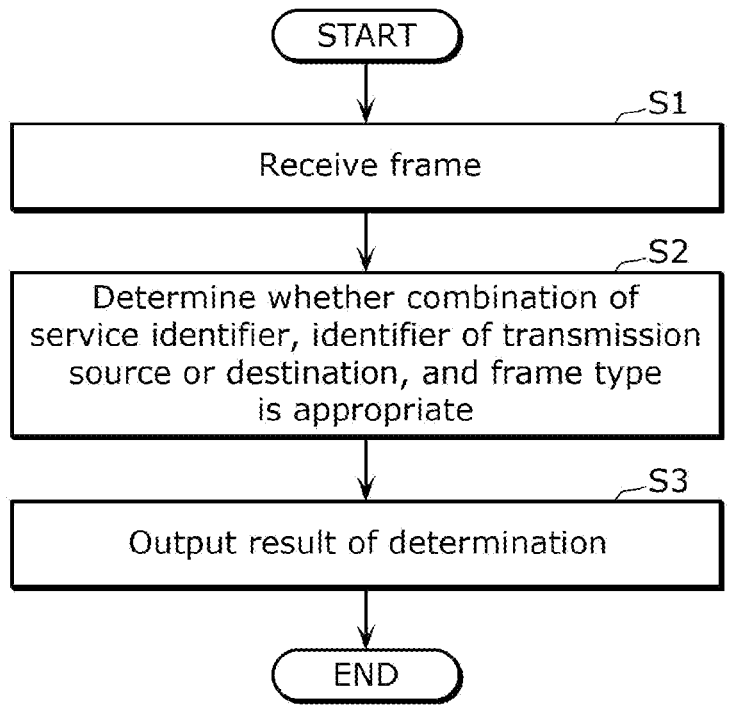
FIG. 19B is a flow chart indicating processing that is performed by the service broker according to the variation of the embodiment.

FIG. 19B is a flow chart indicating processing that is performed by service broker 300 according to the variation.

In Step S1, communication controller 301 receives a frame to be used for offer of a service from the server unit or the client unit.

In Step S2, service manager 302 determines whether the combination of the identifier of the service included in the frame received by communication controller 301 in Step S1, the identifier indicating the transmission source or the destination of the frame, and the type of the frame.

In Step S3, service manager 302 outputs a result of the determination in Step S2.

Through the sequential processes described above, service broker 300 appropriately performs communication access control relating to service offer.

Other Variations

Although the present disclosure has been described based on the above embodiment, the present disclosure is not limited to the above embodiment as a matter of course. The present disclosure includes the cases indicated below.

(1) Although the processing operations have been described taking the SOME/IP communication in the above embodiment, the present disclosure is not limited thereto. Other service oriented communication, or Publish/Subscribe type communication is also possible. For example, Data Distribution Service (DDS) is also possible.

(2) Although FIG. 16 illustrates the processing example of an Offer message and a Find message in the processing of the SD message, other types of SD messages may be processed. For example, client information may be checked also for a Subscribe message. In this way, the target range of message monitoring is widened, and security enhancement is expected.

(3) Although types of ECUs are divided into server ECUs and client ECUs in the on-vehicle network system in the above embodiment, actually, any of the server ECUs may be a client ECU, and any of the client ECU may take a role for a server ECU. In this embodiment, each ECU is merely referred to as a server ECU or a client ECU focusing on a particular service.

(4) Although one of the ECUs notifies the application information and broker ECU 200 verifies the authentication information in the above embodiment, broker ECU 200 may hold the authentication information in advance. Alternatively, notified authentication information may be verified and stored in a non-volatile memory at the time of initial activation at the stage of assembling in a factory. This eliminates the need to verify authentication information every time a vehicle is activated. Thus, it is effective to reduce the amount of communication in the on-vehicle network and reduce the load of processing that is performed by broker ECU 200.

(5) Although the application authentication information is held in the form of plaintext, application authentication information may be encrypted and held. Likewise, a service policy may be encrypted and held.

(6) Although the example in which broker ECU 200 includes an Ethernet switch having a plurality of ports and each of ECUs performs communication via broker ECU 200 in the above embodiment, it is not always necessary that the Ethernet switch is present in broker ECU 200. For example, the server ECU and the client ECU may offer a service by communicating with only broker ECU 200. In this way, it becomes possible to achieve brokering of a service regardless of the physical arrangement of broker ECU 200.

(7) Although not illustrated in the above embodiment, public keys of a car manufacturer and an application vender are held, and the authenticity of application authentication information is verified.

(8) Although the Ethernet communication is performed using plaintext in the above embodiment, it is also possible to perform cryptographic communication that is for example, IPsec, MACsec, or TLS. In addition, it is also possible to encrypt a payload using a session key shared in advance. This is effective because it becomes possible to access a network, and keep information relating to the service secret.

(9) Although an example in which the entire network is connected in the above embodiment, the network may be logically divided by a virtual LAN (VLAN). This is effective because the security strength is enhanced.

(10) Although an example in which a session key is held in one example of application authentication information in the above embodiment, such a session key is not an essential element.

(11) Although a service information example in which an IP address and a state are held as a main state in the above embodiment, information that is held is not limited thereto. For example, a port number which offers a service may be included. Likewise, a port number may be included as client information. This is effective to enhance security because, for example, an unauthorized application operates on a server having an authenticated IP address, and detect communication from an unauthorized port number.

(12) Although presence/absence of proxy transmission is determined by the service policy in the above embodiment, presence/absence of proxy transmission may be determined based on a combination of a service policy and a vehicle state. For example, as for a service for which demand for realtimeliness is changed depending on a vehicle state, presence/absence of proxy transmission may be determined according to a vehicle state.

Figure 19C:
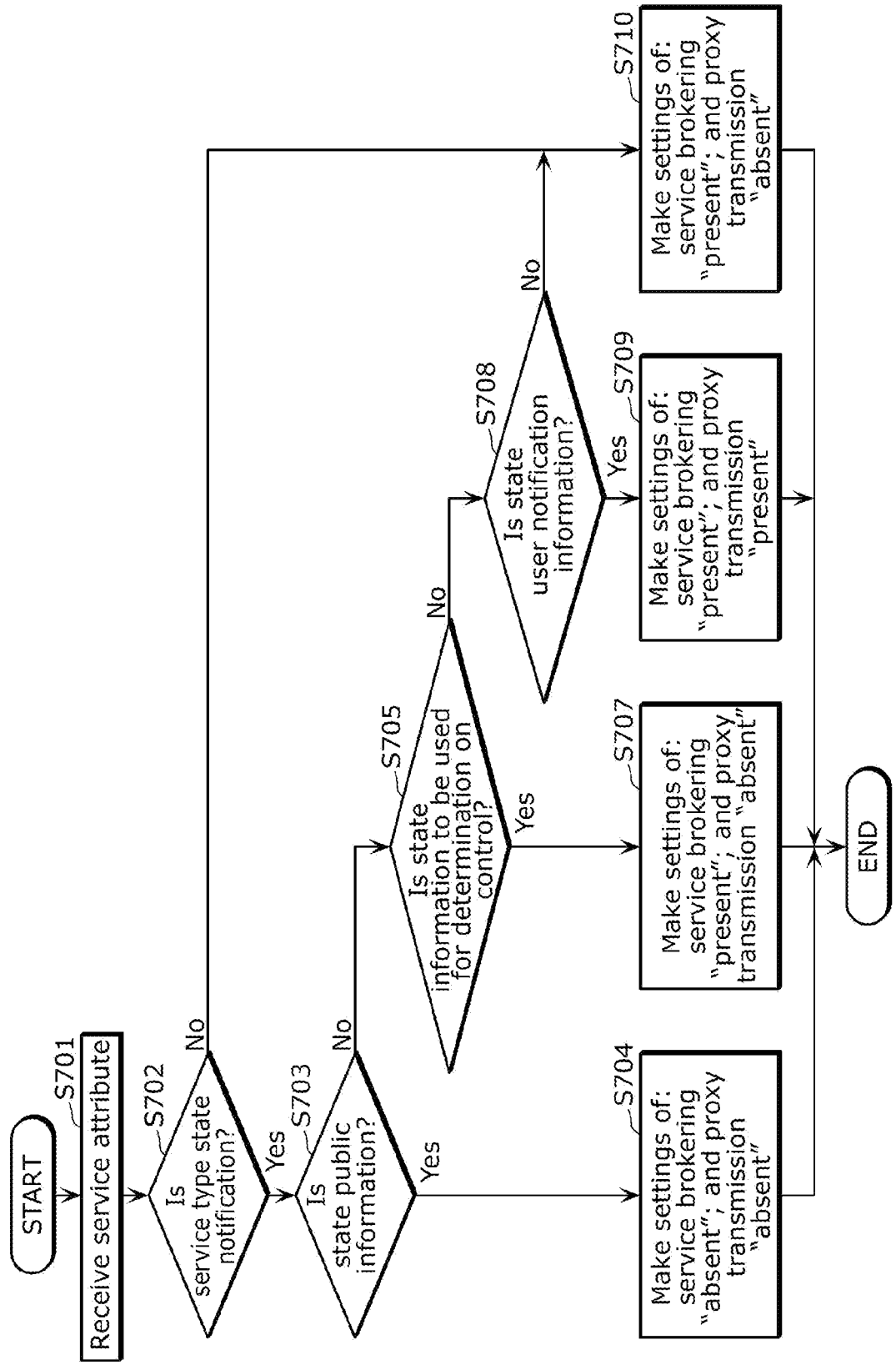
FIG. 19C is a flow chart indicating processing of determining a service brokering method by a broker ECU according to another variation of the embodiment.

(13) Although presence/absence of proxy transmission is determined by the service policy in the above embodiment, presence/absence of proxy transmission may be determined based on the type of a message. FIG. 19C indicates a flow chart in which a service brokering method is determined by broker ECU 200. FIG. 19C illustrates an example in which a brokering method is determined based on an attribute that is set for each service. Attributes of a service may be the type of the service (state notification, control signal, diagnostics, update), or the attribute of a state signal (public/private, control determination information, user notification information).

In Step S701, broker ECU 200 receives the attribute of the service. The attribute of the service may be included in an Offer message, be communicated in a form other than a SOME/IP message, or be described in a manifest file for each service which has been held in advance.

In Step S702, broker ECU 200 determines whether or not the type of the service is a state notification. When determining that the type of the service is the state notification, broker ECU 200 executes Step S703. When the service is not the state notification, broker ECU 200 executes Step S710.

In Step S703, broker ECU 200 determines whether or not the attribute of the state signal of the service is public information. When determining that the attribute of the state signal of the service is public information, broker ECU 200 executes Step S704. When determining that the attribute of the state signal of the service is not public information, broker ECU 200 executes Step S705.

Here, the state signal of the service means a state notification which is notified by the service. The state signal has an attribute. For example, when the state signal is information which can be obtained by all ECUs which participate in a network system, the state signal is assigned "public information" as an attribute. In addition, when a control ECU performs control based on the state signal, the state signal is assigned "control command information (command information)" or "control determination information (sensor information)" as an attribute. Furthermore, a signal for notifying a user such as a driver of information as information that is not directly related to control by control ECU via a sound or a display screen is assigned an attribute "user notification information". A security level (that is, presence or absence of service brokering or proxy transmission) may be determined according to any of the attributes of the state signal.

In Step S704, based on the fact that no problem occurs when any of the clients is offered with the service, broker ECU 200 sets the brokering method for the service to the method in which service brokering is "absent" and proxy transmission is "absent", and ends the processing.

In Step S705, broker ECU 200 determines whether or not the attribute of the state signal of the service is information that is to be used in determination for control. When determining that the attribute of the state signal of the service is information that is to be used in determination for control, broker ECU 200 executes Step S707. When determining that the attribute of the state signal of the service is not information that is to be used in determination for control, broker ECU 200 executes Step S708.

In Step S707, broker ECU 200 sets the brokering method for the service to the method in which proxy transmission is "absent" and service brokering is "present" because real-timeliness is required, and ends the processing.

In Step S708, broker ECU 200 determines whether or not the attribute of the state signal of the service is user notification information. When determining that the attribute of the state signal of the service is user notification information, broker ECU 200 executes Step S709. When the state is not user notification information, broker ECU 200 executes Step S710.

In Step S709, broker ECU 200 sets the brokering method for the service to the method in which proxy transmission is "present" and service brokering is "present" because reliability of the information is desired more than realtimeliness, and ends the processing.

In Step S710, broker ECU 200 sets the brokering method for the service to the method in which service brokering is "present" and proxy transmission is "absent" as default settings.

(14) Although access authority is managed by means of broker ECU 200 verifying authentication information in the above embodiment, verification of authentication information does not need to be always performed.

(15) Although broker ECU 200 discards a message when a mismatch occurs in service information in the above embodiment, processing that is performed when a mismatch occurs in service information is not limited to discard of a message. For example, broker ECU 200 may store information relating to a mismatch as a log, or output the information to outside as a notification. FIG. 20 indicates one example of a log that is output to outside as a notification. The log that is outside as a notification may be displayed for visualization on a display.

FIG. 20 indicates that the log ID that is a serial ID for an anomaly detection log is 100200, and an anomaly code that indicates the type of an anomaly is 0x10 (service policy violation). Furthermore, the detection details indicate that an anomaly in access source information has been detected in the service having the service ID of 0x10. It is indicated that the original packet for which the anomaly has been detected is included in the log, and that, as for the action taken at the time when the anomaly has been detected, the original packet has been discarded, but switching to the sub server has been failed because the vehicle state has not satisfied the switching policy, and thus switching to the sub server has not yet performed.

(16) Although broker ECU 200 performs the processing for switching to the sub server when an anomaly in the main server has been detected in the above embodiment, broker ECU 200 may perform switching to the sub server in an occasion other than the detection of the anomaly. For example, broker ECU 200 may perform load distribution by switching to the sub server according to the processing load of the main server or an increase in communication band. In addition, a sub server may be selected according to a vehicle state. For example, the load of a server may be held for each vehicle state, and broker ECU 200 may switch to a server having the lowest load. Alternatively, each server is assigned a priority, and broker ECU 200 may select a server according to the priority of the server. For example, broker ECU 200 may calculate the priority according to a vehicle state, a communication band, a server load, and a function in an operation, and an appropriate server may be selected according to the priority.

(17) Although the example in which the number of sub servers is one has been described in the above embodiment, the number of sub servers may be two or more.

(18) Although broker ECU 200 waits for reception of messages from a plurality of servers at the time of proxy transmission in the above embodiment, broker ECU 200 may transfer the message received first to the client. This is effective because delay in communication is reduced. In addition, broker ECU 200 may detect occurrence of abnormal communication by comparing a message from a server with a message from another server after transfer of the message. This further enables detection of unauthorized communication, which is effective to enhance security.

(19) Each of the devices in the above embodiment is, specifically, a computer system including a microprocessor, a ROM, a RAM, a hard disk unit, a display unit, a keyboard, a mouse, and so on. A computer program is stored in the RAM or hard disk unit. The respective devices achieve their functions through the microprocessor's operations according to the computer program. Here, in order to achieve predetermined functions, the computer program is configured by combining plural instruction codes indicating instructions for the computer.

(20) A part or all of the constituent elements of the respective devices may be configured with a single system-LSI (Large-Scale Integration). The system-LSI is a super-multi-function LSI manufactured by integrating constituent units on a single chip, and is specifically a computer system configured to include a microprocessor, a ROM, a RAM, and so on. A computer program is stored in the RAM. The system-LSI achieves its function through the microprocessor's operations according to the computer program.

Furthermore, each of the units that are the constituent elements of the respective devices may be made as separate individual chips, or as a single chip to include a part or all thereof.

Furthermore, system-LSI is mentioned here, but there are instances where, due to a difference in the degree of integration, the designations IC, LSI, super LSI, and ultra LSI are used. Furthermore, the means for circuit integration is not limited to an LSI, and implementation with a dedicated circuit or a general-purpose processor is also available. In addition, it is also possible to use a Field Programmable Gate Array (FPGA) that is programmable after the LSI is manufactured, and a reconfigurable processor in which connections and settings of circuit cells within the LSI are reconfigurable.

Furthermore, if integrated circuit technology that replaces LSI appear thorough progress in semiconductor technology or other derived technology, that technology can naturally be used to carry out integration of the functional blocks. Biotechnology is anticipated to apply.

(21) A part or all of the constituent elements constituting the respective devices may be configured as an IC card which can be attached to and detached from the respective devices or as a stand-alone module. The IC card or the module is a computer system configured from a microprocessor, a ROM, a RAM, and so on. The IC card or the module may also be included in the aforementioned super-multi-function LSI. The IC card or the module achieves its functions through the microprocessor's operations according to the computer program. The IC card or the module may also be implemented to be tamper-resistant.

(22) The present disclosure may be implemented as the method described above. Furthermore, the present disclosure may be implemented as computer programs for executing the method, using a computer, and may also be implemented as digital signals including the computer programs.

Furthermore, the present disclosure may also be implemented as computer programs or digital signals recorded on computer-readable recording media such as a flexible disc, a hard disk, a CD-ROM, an MO, a DVD, a DVD-ROM, a DVD-RAM, a BD (Blu-ray Disc), and a semiconductor memory. Furthermore, the present disclosure may also be implemented as the digital signals recorded on these recording media.

Alternatively, the present disclosure may be intended to communicate a computer program or a digital signal via an electronic communication line, wireless or wired communication line, a network represented by the Internet, data broadcasting, etc.

Alternatively, the present disclosure may be a computer system including a micro processor and memory. The memory may store the computer program, and the micro processor may operate according to the computer program.

Alternatively, the program or the digital signal may be executed by another independent computer system by means of the program or the digital signal being recorded in a recording medium and being transferred, or being transferred via a network, or the like.

(23) Although the present disclosure has been described as a security measure for a cyber physical system whose targets are vehicles in the above embodiment, the application range of the present disclosure is not limited thereto. Accordingly, also the application range for the user interface (UI) for visualization of attacks against vehicles is not limited thereto. The present disclosure may be applied to not only vehicles but also mobilities such as construction machines, agricultural machines, vessels, trains, airplanes, communication networks for use in industrial control systems in factories and buildings, or communication networks for controlling embedded devices.

(24) The present disclosure has been described as the security measure for the cyber physical system targeting vehicles in the above embodiment. However, the result of a determination on each process in a security function and an output result may be displayed as a user interface (UI) for visualization of an attack in a cyber physical system. The present disclosure may be applied to not only vehicles but also mobilities such as construction machines, agricultural machines, vessels, trains, airplanes, communication networks for use in industrial control systems in factories and buildings, or communication networks for controlling embedded devices.

(25) The embodiment and any of the variations may be combined.

INDUSTRIAL APPLICABILITY

The present disclosure performs verification of authentication by a broker even when an attacker has transmitted an unauthorized frame in an on-vehicle network in which service oriented communication is applied. Furthermore, offer of the brokering method according to a service policy and a vehicle state enables achievement of both security and realtimeliness according to a service.

The invention claimed is:

1. A service broker, the service broker being connected to each of a server electronic control unit and a client electronic control unit in a service offer system for offering a service from the server electronic control unit to the client electronic control unit by way of a service oriented communication, the service broker comprising:
   a communication controller that receives a frame for use in an offer of the service, from the server electronic control unit or the client electronic control unit; and
   a processor that determines, as a determination, whether a combination of a service identifier included in the frame received by the communication controller, an identifier indicating one of a transmission source and a destination of the frame, and a type of the frame is appropriate, and that provides an output of a result of the determination,
   wherein the service broker is connected to the server electronic control unit and the client electronic control unit in an on-vehicle network,
   the frame is transmitted in the on-vehicle network,
   the frame includes a first identifier of the server electronic control unit and a second identifier of the client electronic control unit, and
   the service broker, upon receipt of the frame, changes at least one of the first identifier of the server electronic control unit or the second identifier of the client electronic control unit.

2. The service broker according to claim 1,
   wherein the communication controller further:
      receives a service offer frame from the server electronic control unit before the offer of the service, the service offer frame including first service information indicating the service to be offered; and
      receives a service find frame from the client electronic control unit before the offer of the service, the service find frame including second service information indicating a service find target, and
   the processor further:
      causes the communication controller to transmit the service offer frame to the client electronic control unit, the service offer frame including the first service information identical to the second service information included in the service find frame received by the communication controller, the client electronic control unit being a transmission source of the service find frame received.

3. The service broker according to claim 2,
   wherein the service offer frame includes first authentication information indicating that the server electronic control unit has authority as a server that offers the service indicated by the first service information included in the service offer frame,
   the service find frame includes second authentication information indicating that the client electronic control unit has authority as a client that is offered with the service indicated by the second service information included in the service find frame, and
   the processor further:
      determines that the service offer frame is valid, when the first authentication information included in the service offer frame has been successfully verified;

determines that the service find frame is valid, when the second authentication information included in the service find frame has been successfully verified; and causes the communication controller to transmit the service offer frame to the client electronic control unit, when the processor has determined that the service offer frame and the service find frame are valid.

4. The service broker according to claim 1, wherein, when the communication controller has received a first frame for use in the offer of the service from the server electronic control unit that offers the service, the communication controller transmits the first frame to the client electronic control unit that is offered with the service, and when the communication controller has received a second frame for use in the offer of the service from the client electronic control unit that is offered with the service, the communication controller transmits the second frame to the server electronic control unit that offers the service.

5. The service broker according to claim 4, further comprising:

a proxy transmitter that executes proxy transmission processing, wherein the proxy transmission processing includes:

modifying information indicating a transmission source included in the first frame into an identifier of the service broker, and transmitting the first frame to the client electronic control unit, when the communication controller has received the first frame; and modifying information indicating a transmission source included in the second frame into an identifier of the service broker, and transmitting the second frame to the server electronic control unit, when the communication controller has received the second frame.

6. The service broker according to claim 5, wherein the server electronic control unit, the client electronic control unit, and the service broker are provided in a vehicle, the service broker further includes a vehicle state holder that holds state information indicating a state of the vehicle, and the proxy transmitter controls whether to execute the proxy transmission processing according to the state information held by the vehicle state holder.

7. The service broker according to claim 2, wherein the server electronic control unit includes a first server electronic control unit and a second server electronic control unit, and when the communication controller has received the service offer frame from the first server electronic control unit, the communication controller is in a standby state for a predetermined period; and when the communication controller has received the service offer frame from the second server electronic control unit in the standby state, the communication controller transmits, to the client electronic control unit, one of the service offer frame received from the first server electronic control unit and the service offer frame received from the second server electronic control unit.

8. The service broker according to claim 7, wherein, when the communication controller does not receive the service offer frame from the second server electronic control unit in the standby state, the communication controller transmits the service offer frame received from the first server electronic control unit to the client electronic control unit, and executes predetermined processing that is performed when an anomaly has occurred in the second server electronic control unit.

9. The service broker according to claim 7, wherein, when the communication controller does not receive the service offer frame from the second server electronic control unit in the standby state, the communication controller controls whether to transmit the service offer frame received from the first server electronic control unit to the client electronic control unit according to a type of the service.

10. The service broker according to claim 7, wherein the server electronic control unit, the client electronic control unit, and the service broker are provided in a vehicle, the service broker further includes a vehicle state holder that holds state information indicating a state of the vehicle, and when the communication controller does not receive the service offer frame from the second server electronic control unit in the standby state, the communication controller controls whether to transmit the service offer frame received from the first server electronic control unit to the client electronic control unit according to the state information held by the vehicle state holder.

11. The service broker according to claim 2, wherein the server electronic control unit includes a first server electronic control unit and a second server electronic control unit, and when the communication controller has received the service find frame from the client electronic control unit, the communication controller transmits the service find frame received, to both the first server electronic control unit and the second server electronic control unit.

12. The service broker according to claim 2, wherein the server electronic control unit comprises a plurality of server electronic control units, and the processor:

holds communication state information indicating whether the plurality of server electronic control units are in a communication possible state; and transmits the communication state information held to the client electronic control unit.

13. The service broker according to claim 12, wherein, when the processor has detected that one of the plurality of server electronic control units is in a communication impossible state, the processor transmits, to the client electronic control unit, the service offer frame received from one of the plurality of server electronic control units that is in the communication possible state, with reference to the communication state information.

14. The service broker according to claim 1, wherein the output of the result of the determination includes at least one of:

displaying information indicating the result of the determination onto a display screen; and transmitting the information indicating the result of the determination to an external device via a network.

15. A service brokering method that is performed by a service broker, the service broker being in a service offer system for offering a service from a server electronic control unit to a client electronic control unit by way of a service oriented communication, the service brokering method comprising:
- receiving a frame for use in an offer of the service from the server electronic control unit or the client electronic control unit;
- determining whether a combination of a service identifier included in the frame received by the service broker, an identifier indicating one of a transmission source and a destination of the frame, and a type of the frame is appropriate; and
- providing an output of a result of the determining,
- wherein the service broker is connected to the server electronic control unit and the client electronic control unit in an on-vehicle network,
- the frame is transmitted in the on-vehicle network,
- the frame includes a first identifier of the server electronic control unit and a second identifier of the client electronic control unit, and
- the service broker, upon receipt of the frame, changes at least one of the first identifier of the server electronic control unit or the second identifier of the client electronic control unit.

16. A non-transitory computer readable recording medium including a program stored therein for causing a computer to execute a service brokering method, the service brokering method being performed by a service broker, the service broker being in a service offer system for offering a service from a server electronic control unit to a client electronic control unit by way of a service oriented communication, the service brokering method comprising:
- receiving a frame for use in an offer of the service from the server electronic control unit or the client electronic control unit;
- determining whether a combination of a service identifier included in the frame received by the service broker, an identifier indicating one of a transmission source and a destination of the frame, and a type of the frame is appropriate; and
- providing an output of a result of the determining,
- wherein the service broker is connected to the server electronic control unit and the client electronic control unit in an on-vehicle network,
- the frame is transmitted in the on-vehicle network,
- the frame includes a first identifier of the server electronic control unit and a second identifier of the client electronic control unit, and
- the service broker, upon receipt of the frame, changes at least one of the first identifier of the server electronic control unit or the second identifier of the client electronic control unit.

* * * * *